(12) United States Patent
Thiele et al.

(10) Patent No.: US 8,217,103 B2
(45) Date of Patent: Jul. 10, 2012

(54) SILANE-SULFIDE CHAIN END MODIFIED ELASTOMERIC POLYMERS

(75) Inventors: Sven Thiele, Halle (DE); Joachim Kiesekamp, Schkopau (DE); Norbert Jantsch, Halle (DE); Thomas Knispel, Halle (DE)

(73) Assignee: Styron Europe GmbH, Horgen (CH)

( * ) Notice: Subject to any disclaimer, the term of this patent is extended or adjusted under 35 U.S.C. 154(b) by 0 days.

(21) Appl. No.: 13/198,312

(22) Filed: Aug. 4, 2011

(65) Prior Publication Data

US 2011/0301261 A1      Dec. 8, 2011

(51) Int. Cl.
*C08K 5/24* (2006.01)
(52) U.S. Cl. ..................... 524/262; 525/332.6
(58) Field of Classification Search .................. 524/262; 525/332.6
See application file for complete search history.

(56) References Cited

U.S. PATENT DOCUMENTS

| | | |
|---|---|---|
| 3,078,254 A | 2/1963 | Zelinski et al. |
| 3,244,664 A | 4/1966 | Zelinski et al. |
| 3,281,383 A | 10/1966 | Zelinski et al. |
| 3,350,345 A | 10/1967 | Vanderbilt et al. |
| 3,692,874 A | 9/1972 | Farrar et al. |
| 3,978,103 A | 8/1976 | Meyer-Simon et al. |
| 4,002,594 A | 1/1977 | Fetterman |
| 4,048,206 A | 9/1977 | Voronkov et al. |
| 4,082,790 A | 4/1978 | Speier |
| 4,474,908 A | 10/1984 | Wagner |
| 4,544,711 A | 10/1985 | Mancinelli |
| 4,616,069 A | 10/1986 | Watanabe et al. |
| 4,839,434 A | 6/1989 | Bronstert et al. |
| 5,151,469 A | 9/1992 | Hergenrother et al. |
| 6,147,242 A | 11/2000 | Batz-Sohn |
| 6,166,108 A | 12/2000 | Materne et al. |
| 6,229,036 B1 | 5/2001 | Batz-Sohn et al. |
| 6,465,544 B1 | 10/2002 | Bomal et al. |
| 6,579,949 B1 | 6/2003 | Hergenrother et al. |
| 6,664,328 B1 | 12/2003 | Rodewald et al. |
| 6,777,569 B1 | 8/2004 | Westmeyer et al. |
| 6,790,921 B1 | 9/2004 | Rodewald et al. |
| 2004/0181000 A1 | 9/2004 | Araujo-Da-Silva et al. |
| 2005/0124740 A1 | 6/2005 | Klockmann et al. |
| 2005/0159513 A1 | 7/2005 | Henning et al. |

FOREIGN PATENT DOCUMENTS

| | | |
|---|---|---|
| EP | 0916699 A2 | 5/1999 |
| EP | 1191056 A1 | 3/2002 |
| EP | 1486513 A1 | 12/2004 |
| EP | 1605002 A1 | 12/2005 |
| WO | WO 99/09036 A1 | 2/1999 |
| WO | WO 03/097734 A1 | 11/2003 |

OTHER PUBLICATIONS

"Synthesis of end-functionalized polymer by means of living anionic polymerization", *Journal of Macromolecular Chemistry and Physics*, 197, pp. 3135-3148, 1996.

"Determination of sequence length distribution in SBR by ozonolysis-g.p.c. method", *Polymer*, vol. 22, pp. 1721-1723, 1981.

*Primary Examiner* — Peter D Mulcahy
(74) *Attorney, Agent, or Firm* — Brinks Hofer Gilson & Lione; G. Peter Nichols

(57) ABSTRACT

A chain end modified polymer comprising the reaction product of a living anionic elastomeric polymer and a silane-sulfide modifier A preferred class of modifiers includes compounds represented by the formula: $(RO)x(R)_ySi-R'-S-SiR_3$, wherein Si is silicon; S is sulfur; O is oxygen; x is an integer selected from 1, 2 and 3; y is an integer selected from 0, 1, and 2; x+y=3; R is the same or different and is: $(C_1-C_{16})$ alkyl; and R' is aryl, alkylaryl, or $(C_1-C_{16})$ alkyl. The invention further includes methods for making such chain end modified polymers, their use in preparing vulcanized elastomeric polymer compositions, and articles made from such compositions, including pneumatic tires, tire treads, belts, and the like. The subject compositions exhibit lower Tan δ at 60° C. values, while maintaining good processing characteristics, and a good balance of physical properties, including: abrasion resistance, tensile strength, modulus and elongation at break.

27 Claims, No Drawings

SILANE-SULFIDE CHAIN END MODIFIED ELASTOMERIC POLYMERS

REFERENCE TO PRIOR APPLICATION

This application claims priority to PCT Application No. PCT/US2006/041072 filed Oct. 19, 2006 published in English on Apr. 26, 2007 as WO 2007/047943 and also to U.S. application Ser. No. 12/090,284 filed Apr. 15, 2008 and to U.S. Provisional Application No. 60/728,174 filed on Oct. 19, 2005, the entire contents of each are incorporated herein by reference.

BACKGROUND OF THE INVENTION

This invention generally relates to functionalized or "chain end modified" elastomeric polymers, their use in the preparation of elastomeric compositions and articles made therefrom. The invention specifically relates to the use of so called "sulfanylsilanes" as chain end modifiers for "living" anionic elastomeric polymers. The polymer "end caps" are reactive with unsaturated portions of the elastomeric polymer backbone and/or with fillers or other components present in an elastomeric composition. These modified elastomeric polymers are useful in the preparation of vulcanized elastomeric compositions having relatively low hysteresis loss. Such compositions are useful in many articles including tire treads having low rolling resistance, along with a good balance of other desirable physical and chemical properties, for example, wet skid properties, abrasion resistance, tensile strength and processability.

A major source of hysteresis in vulcanized elastomeric polymers is believed to be attributed to free polymer chain ends, that is, the section of the elastomeric polymer chain between the last cross-link and the end of the polymer chain. This free end of the polymer does not participate in any efficient elastically recoverable process, and as a result, any energy transmitted to this section of the polymer is lost. This dissipated energy leads to a pronounced hysteresis under dynamic deformation. The hysteresis loss of an elastomeric polymer composition is related to its tan δ at 60° C. value. In general, vulcanized elastomeric polymer compositions having relatively small tan δ at 60° C. values are preferred as having lower hysteresis loss. In tires, this translates to a lower rolling resistance and better fuel economy.

One generally accepted approach to reducing hysteresis loss is to reduce the number of free chain ends of elastomeric polymers. Various techniques are described in the open literature including the use of "coupling agents," such as tin tetrachloride, which may functionalize the polymer chain end and react with unsaturated portions of the polymer backbone and/or other constituents in an elastomeric composition, such as a filler. Examples of such techniques along with other documents of interest include: U.S. Pat. Nos. 3,281,383; 3,244,664 and 3,692,874 (e.g. tetrachlorosilane); U.S. Pat. Nos. 3,978,103; 4,048,206; 4,474,908; 6,777,569 (blocked mercaptosilanes) and U.S. Pat. No. 3,078,254 (a multi-halogen-substituted hydrocarbon such as 1,3,5-tri(bromo methyl) benzene); U.S. Pat. No. 4,616,069 (tin compound and organic amino or amine compound); and U.S. 2005/0124740.

"Synthesis of end-functionalized polymer by means of living anionic polymerization," Journal of Macromolecular Chemistry and Physics, 197, (1996), 3135-3148, describes the synthesis of polystyrene and polyisoprene containing living polymers with hydroxy (—OH) and mercapto (—SH) functional end caps obtained by reacting the living polymer with haloalkanes containing silyl ether and silyl thioether functions. The tertiary-butyldimethylsilyl (TBDMS) group is preferred as protecting group for the —OH and —SH functions in the termination reactions because the corresponding silyl ethers and thioethers are found to be both, stable and compatible with anionic living polymers.

U.S. Pat. No. 6,579,949 describes the use of similar class of sulfur compounds, including tert-butyl dimethylsilyl-3-chloro-1-propylsulfide (Cl—(CH$_2$)3-S—Si—(CH$_3$)$_2$C(CH$_3$)$_3$) to produce rubber articles having low hysteresis loss. More specifically, the subject sulfur compounds are reacted with anionically-initiated, living polymers to produce chain end modified polymers, which are subsequently blended with fillers, vulcanizing agents, accelerators, oil extenders, and other various additives to produce tires having low hysteresis loss. The tert-butyl dimethylsilylpropylsulfide end cap is not easily removed during standard polymerization conditions, but the protective tert-dimethylsilyl group is cleaved by reaction with additives containing H$^+$, F$^-$ or zinc compounds prior to, or during, vulcanization, thus leaving a mercapto ("thiol") group to react (at least 20 percent) with unsaturated segments of the backbone of other elastomeric polymers. Unfortunately, the chain end modification reaction produces lithium chloride. Chloride ions present in the reaction strongly accelerate corrosion in processing equipment.

U.S. Pat. No. 6,229,036 discloses a broad class of sulfanylsilanes prepared by reacting mercaptosilanes with chlorosilanes, and their use as coupling agents in rubber mixtures to produce tire treads having low rolling resistance and good wet grip. Many sulfanylsilane compounds are described including: (EtO)$_3$—Si—(CH$_2$)$_3$—S—Si—(CH$_3$)$_3$ and (MeO)$_3$—Si—(CH$_2$)$_3$—S—Si—(C$_2$H$_5$)$_3$. According to this reference, elastomeric polymers are prepared and terminated via conventional techniques, and subsequently mixed with oxidic fillers and from 0.1 to 15 weight percent (with respect to the filler) of a sulfanylsilane coupling agent, and then vulcanized to form a rubber product. Thus, unlike the approach described in U.S. Pat. No. 6,579,949, the sulfanylsilane coupling agent is not used as a chain end modifier to a living polymer, but is only combined with a post-terminated elastomeric polymer during compounding. This approach is disadvantaged due to the difficulty of distributing the coupling agent throughout the rubber mixture during compounding. That is, unlike the typical low viscous, solvent-based environment associated with most anionic polymerizations, the rubber compounding environment is typically highly viscous and solvent free, thus leading to a less homogenous distribution of the coupling agent throughout the composition. As consequence, the interaction of the functionalized polymer with the filler material and/or unsaturated segments of the polymer backbone is less complete. If the modifier compound is added to a polymer comprising exclusively terminated polymer chains, it is not possible to efficiently combine (or react) the chain ends of this polymer with other polymer chains, or with fillers, by using the modifier compound. In addition, it is not possible to efficiently combine or link the polymer to fillers or other polymer chains.

SUMMARY OF THE INVENTION

The invention provides a chain end modified elastomeric polymer, comprising the reaction product of:
  i) a living anionic elastomeric polymer, and
  ii) a silane-sulfide modifier represented by the formula:

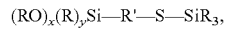

wherein:
Si is silicon; S is sulfur; O is oxygen;
x is an integer selected from 1, 2 and 3;
y is an integer selected from 0, 1, and 2; x+y=3;
R is the same or different and is ($C_1$-$C_{16}$) alkyl; and R' is aryl, alkylaryl, or ($C_1$-$C_{16}$) alkyl.

In another aspect, the invention also provides a vulcanized elastomeric polymer composition, comprising the reaction product of the following:
1) a filler;
2) a vulcanization agent; and
3) a chain end modified elastomeric polymer, and wherein the chain end modified elastomeric polymer is the reaction product of:
  i) a living anionic elastomeric polymer, and
  ii) a silane-sulfide modifier represented by the formula:

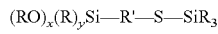

(RO)$_x$(R)$_y$Si—R'—S—SiR$_3$ wherein:
Si is silicon; S is sulfur; O is oxygen;
x is an integer selected from 1, 2 and 3;
y is an integer selected from 0, 1, and 2; x+y=3;
R is the same or different and is ($C_1$-$C_{16}$) alkyl; and
R' is aryl, alkylaryl, or ($C_1$-$C_{16}$) alkyl.

In yet another aspect, the invention provides a method for making a vulcanized elastomeric polymer composition, comprising combining the following constituents:
1) a filler;
2) a vulcanization agent; and
3) a chain end modified elastomeric polymer, which is the reaction product of:
  i) a living anionic elastomeric polymer, and
  ii) a silane-sulfide modifier represented by the formula:

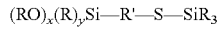

(RO)$_x$(R)$_y$Si—R'—S—SiR$_3$ wherein:
Si is silicon; S is sulfur; O is oxygen;
x is an integer selected from 1, 2 and 3;
y is an integer selected from 0, 1, and 2; x+y=3;
R is the same or different and is ($C_1$-$C_{16}$) alkyl; and
R' is aryl, alkylaryl, or ($C_1$-$C_{16}$) alkyl.

The invention also provides a chain end modified elastomeric polymer, comprising the reaction product of:
  i) a living anionic elastomeric polymer, and
  ii) a silane-sulfide modifier represented by the formula:

GJMSi-A-S—SiTXZ wherein:
Si is silicon; S is sulfur; G is ($C_1$-$C_{16}$) alkoxy;
J and M are the same or different, and are each independently selected from the group consisting of: hydrogen (H), ($C_1$-$C_{16}$) alkyl, ($C_1$-$C_{16}$) alkoxy, ($C_7$-$C_{16}$) aryl, ($C_7$-$C_{16}$) alkylaryl, and -A-S—SiTXZ (where A, T, X and Z are defined below);

A is an aryl, an alkylaryl, a ($C_7$-$C_{16}$) alkylaryl, or a ($C_1$-$C_{16}$) alkyl which may be linear or branched, saturated or unsaturated and may be substituted with: ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, thioalkyl, -A-S—SiTXZ (where A, T, X and Z are defined below); and T, X and Z groups are the same or different, and are each independently selected from the group consisting of: hydrogen (H), ($C_1$-$C_{16}$) alkyl, ($C_1$-$C_{16}$) alkoxy, ($C_7$-$C_{16}$) aryl, ($C_7$-$C_{16}$) aralkyl, and —S-A-SiMJG (A, M, J and G are defined herein). The invention also provides for a vulcanized elastomeric polymer composition comprising this chain end modified elastomeric polymer, and for methods for preparing the same.

DETAILED DESCRIPTION OF THE INVENTION

The subject invention includes a chain end modified polymer comprising the reaction product of a living anionic elastomeric polymer and a silane-sulfide modifier represented by Formula 1, and more preferably by Formula 2, each as presented below. The invention further includes methods for making such chain end modified polymers, their use in preparing vulcanized elastomeric polymer compositions, and articles made from such compositions such as pneumatic tires, tire treads, belts, footwear and the like.

The subject compositions exhibit lower tan δ at 60° C. values, while maintaining good processing characteristics, and a good balance of physical properties, including one or more of the following properties: abrasion resistance, tensile strength, modulus and elongation at break. The subject compositions are useful in preparing tire treads having lower rolling resistance, while maintaining good wet grip properties. The subject compositions are particularly useful in preparing tires including fillers, such as carbon black, silica, carbon-silica dual phase filler, and the like.

The term "elastomeric polymers" is intended to mean elastomers or rubbers, including cross-linkable polymers, that when cross-linked, have properties similar to vulcanized natural rubber (cis-1,4-polyisoprene), for example, stretch under tension and retract relatively quickly to approximately the original length when released.

The use of lithium initiators to polymerize conjugated diene, triene, and monovinyl aliphatic and aromatic monomers is well known. These polymerizations proceed according to anionic polymerization mechanisms, wherein the reaction of monomers, by nucleophilic initiation, form and propagate a polymeric structure. Throughout the polymerization, the polymer structure is ionic or "living." Thus, the polymer structure has at least one reactive or "living" end. This is the context of the term "living," as used herein, to describe the subject elastomeric polymers.

Thus, as discussed above, the term "living anionic elastomeric polymer," as used herein, refers to a polymer comprising polymer chains, in which each chain contains a reactive anionic end group located at "at least one end" of the polymer chain. This term is known in the art.

As discussed herein, the terms "chain end modified elastomeric polymer," "chain end modified polymer," "chain end modified elastomer," and similar terms, as used herein, refer the reaction product of a "living anionic elastomeric polymer" with a silane-sulfide modifier, as shown in Formula 1 or Formula 2 below. One, or more than one, polymer chain may react with one silane-sulfide modifier (see also Formula 5).

In one embodiment, the living anionic elastomeric polymer is selected from the group consisting of homopolymers of isoprene, homopolymers of butadiene, copolymers of butadiene with styrene, copolymers of isoprene with styrene, terpolymers butadiene with isoprene and styrene, and combinations thereof. In another embodiment, the living anionic elastomeric polymer is selected from the group consisting of homopolymers of butadiene and copolymers of butadiene with styrene.

Monomers useful in preparing the subject elastomeric polymers include conjugated olefins and olefins chosen from the group comprising α-olefins, internal olefins, cyclic olefins, polar olefins and nonconjugated diolefins. Suitable conjugated unsaturated monomers are preferably conjugated dienes, such as: 1,3-butadiene, 2-alkyl-1,3-butadiene, preferably, isoprene (2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene. Preferred olefins are $C_{2-20}$ α-olefins including, but not limited to, long chain macromolecular α-olefins, more especially an aromatic vinyl compound. Preferred aromatic vinyl compounds are styrene, including $C_{1-4}$ alkyl substituted styrene, such as 2-methylstyrene, 3-methylstyrene, 4-methylstyrene, 2,4-dimethylstyrene, 2,4,6-trimethylstyrene, α-methylstyrene and stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, tert-butoxystyrene, vinylpyridine, and mixtures thereof. Suitable polar olefins included acrynitrile, methacrylates, methylmethacrylate. Suitable nonconjugated olefins include: $C_{4-20}$ diolefins, especially norbornadiene, ethylidenenorbornene, 1,4-hexadiene, 1,5-hexadiene, 1,7-octadiene, 4-vinylcyclohexene, divinylbenzene including 1,2-divinylbenzene, 1,3-divinylbenzene and 1,4-divinylbenzene and mixtures thereof. Preferred conjugated dienes include: butadiene, isoprene and cyclopentadiene, and preferred aromatic α-olefins include: styrene and 4-methylstyrene.

Examples of applicable elastomeric polymers include homopolymers of conjugated dienes, especially butadiene or isoprene, and random or block co- and terpolymers of at least one conjugated diene, especially butadiene or isoprene, with at least one aromatic α-olefin, especially styrene and 4-methylstyrene, aromatic diolefin, especially divinylbenzene. Especially preferred is the random copolymerization, optionally terpolymerization, of at least one conjugated diene with at least one aromatic α-olefin, and optionally, at least one aromatic diolefin or aliphatic α-olefin, especially butadiene or isoprene with styrene, 4-methylstyrene and/or divinylbenzene.

Preferred modified elastomeric polymers (or modified polymers) include modified polybutadiene, modified polyisoprene, modified styrene-butadiene copolymer, modified styrene-isoprene copolymer, modified butadiene-isoprene copolymer, and modified isoprene-styrene copolymer. More preferred elastomers (or polymers) include modified polybutadiene and modified styrene-butadiene copolymer. The terms "modified elastomeric polymers" and "modified polymers" refer to the "chain end modified polymers" as discussed above.

In one embodiment, the modified elastomeric polymer is selected from the group consisting of modified homopolymers of isoprene, modified homopolymers of butadiene, modified copolymers of butadiene with styrene, modified copolymers of isoprene with styrene, modified terpolymers butadiene with isoprene and styrene, and combinations thereof. In another embodiment, the modified elastomeric polymer is selected from the group consisting of modified homopolymers of butadiene and modified copolymers of butadiene with styrene.

In general, the polymerization of the diene monomer(s) or copolymerization of the diene monomer(s) with the α-olefin monomer(s) may be accomplished at conditions well known in the art for anionic living type polymerization reactions, such as temperatures from −50 to 250° C., preferably from 0 to 120° C. The reaction temperature may be the same as the polymerization initiation temperature. The polymerization can be effected at atmospheric pressure, at sub-atmospheric pressure, or at elevated pressures of up to, or even higher than, 500 MPa, continuously or discontinuously. Preferably, the polymerization is performed at pressures from 0.01 to 500 MPa, most preferably from 0.01 to 10 MPa, and in particular from 0.1 to 2 MPa. Higher pressures can be applied. In such a high-pressure process the initiator according to the present invention can also be used with good results. Solution polymerizations normally take place at lower pressures, preferably below 10 MPa. The polymerization can be carried out in the gas phase as well as in a liquid reaction medium. The polymerization is generally conducted under batch, continuous or semi-continuous polymerization conditions. The polymerization process can be conducted as a gas phase polymerization (for example, in a fluidized bed or stirred bed reactor), as a solution polymerization, wherein the polymer formed is substantially soluble in the reaction mixture, a suspension/slurry polymerization, wherein the polymer formed is substantially insoluble in the reaction medium or as a so-called bulk polymerization process, in which an excess of monomer to be polymerized is used as the reaction medium.

Polymerization of the aforementioned monomers is typically initiated with an anionic initiator, such as, but not limited to, an organo metal compound having at least one lithium, sodium, potassium or magnesium atom, the organo metal compounds containing from 1 to about 20 carbon atoms. Preferably the organo metal compound has at least one lithium atom, such as: ethyl lithium, propyl lithium, n-butyl lithium, sec-butyl lithium, tert-butyl lithium, phenyl lithium, hexyl lithium, 1,4-dilithio-n-butane, 1,3-di(2-lithio-2-hexyl) benzene, preferably n-butyl lithium and sec-butyl lithium. These organo lithium initiators may be used alone or in combination as a mixture of two or more different kinds. The amount of organo lithium initiator used varies based upon the monomers being polymerized and on the target molecular weight of the produced polymer; however, the amount is typically 0.1 to 5 mmol, preferably 0.3 to 3 mmol per 100 grams of monomer (total polymerizable monomer).

Polar coordinator compounds may be optionally added to the polymerization mixture to adjust the microstructure (the content of vinyl bond) of the conjugated diolefin portion of the "diolefin-type homo-, copolymer or terpolymer," or to adjust the composition distribution of the aromatic vinyl compound in the "conjugated diene monomer containing co- or terpolymer," and thus, for example, to serve as randomizer component. Polar coordinator compounds are, for example, but not limited to, ether compounds, such as diethyl ether, di-n-butyl ether, ethylene glycol diethyl ether, ethylene glycol dibutylether, diethylene glycol dimethyl ether, propylene glycol dimethyl ether, propylene glycol diethyl ether, propylene glycol dibutylether, alkyltetrahydroforylethers, such as, methyltetrahydrofurylether, ethyltetrahydrofurylether, propyltetrahydrofurylether, butyltetrahydrofurylether, hexyltetrahydrofurylether, octyltetrahydrofurylether, tetrahydrofuran, 2,2-(bistetrahydrofurfuryl)propane. bistetrahydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene, and dimethoxyethane and/or tertiary amine compounds such as butyl ether of triethylamine, pyridine, N,N,N',N'-tetramethyl ethylenediamine, dipiperidinoethane, methyl ether of N,N-diethylethanolamine, ethyl ether of N,N-diethylethanolamine, and N,N-diethylethanolamine. The polar coordinator compound will typically be added at a molar ratio of the polar coordinator compound to the lithium initiator within the range of about 0.012:1 to about 5:1, but typically about 0.1:1 to about 4:1, preferably 0.25:1 to about 3:1, and more preferably 0.5:1 to about 3:2.

The polymerization can optionally be conducted utilizing an oligomeric oxolanyl alkane as a polar coordinator compound. Examples of such compounds are provided in U.S. Pat. Nos. 6,790,921 and 6,664,328, each incorporated herein by reference.

The polymerization can optionally include accelerators to increase the reactivity of the initiator, to randomly arrange, aromatic vinyl compounds introduced in the polymer, or to provide a single chain of aromatic vinyl compounds, and thus influencing the composition distribution of the aromatic vinyl compounds in a "conjugated diene containing modified copolymer or terpolymer" of the invention. Examples of applicable accelerators include sodium and potassium alkoxides or potassium phenoxides, such as potassium isopropoxide, potassium t-butoxide, potassium t-amyloxide, potassium n-heptaoxide, potassium benzyloxide, potassium phenoxide; potassium salts of carboxylic acids such as isovalerianic acid, caprylic acid, lauryl acid, palmitic acid, stearic acid, oleic acid, lino lenic acid, benzoic acid, phthalic acid, or 2-ethylhexanoic acid; potassium salts of organic sulfonic acids such as dodecyl benzenesulfonic acid, tetradecyl benzenesulfonic acid, hexadecyl benzenesulfonic acid, or octadecyl benzenesulfonic acid; and potassium salts of organic phosphorous acids such as diethyl phosphite, diisopropyl phosphite, diphenyl phosphite, dibutyl phosphite, and dilauryl phosphite. These potassium compounds may be added in an amount of 0.005-0.5 mol for 1.0 gram atom equivalent of lithium initiator. If less than 0.005 mol are added, a sufficient effect is not typically achieved. On the other hand, if the amount of the potassium compound is more than about 0.5 mol, the productivity and efficiency of chain end modification reaction is significantly reduced.

An alkali metal alkoxide compound may also be added together with the polymerization initiator to increase the polymerization reactivity. The alkali metal alkoxide compound can be prepared by reacting an alcohol and an organic alkali metal compound. This reaction may be carried out in a hydrocarbon solvent in the presence of monomers, preferably conjugated diolefin monomers and aromatic vinyl compound monomers prior to the copolymerization of these monomers. Alkali metal alkoxide compound are exemplary represented by metal alkoxides of tetrahydrofurfuryl alcohol, N,N-dimethyl ethanolamine, N,N-diethyl ethanolamine, 1-piperazine ethanolamine, or the like. An organic alkali metal compound preferably may be an organolithium compound, and can be used as reactant for an alcohol compound to prepare an alkali metal alkoxide. For example, ethyl lithium, propyl lithium, n-butyllithium, sec-butyl lithium, tert-butyl lithium, and hexyl lithium, and mixtures of these can be given. Of these, n-butyl lithium and sec-butyl lithium are preferable. The molar ratio of an alcoholic compound and an organolithium compound should be from 1:0.7 to 1:5.0, preferably from 1:0.8 to 1:2.0, and more preferably from 1:0.9 to 1:1.2. If the molar ratio of an organolithium compound to an alcoholic compound is more than 5.0, the effect on improvement of tensile strength, abrasion resistance, and hysteresis is compromised. On the other hand, a molar ratio of the organolithium compound smaller than 0.8 retards the speed of polymerization and significantly decreases productivity giving rise to low efficiency of the chain end modification reaction.

To further control polymer molecular weight and polymer properties, a coupling agent or linking agent may be employed. For example, a tin halide, a silicon halide, a tin alkoxide, a silicon alkoxide, or a mixture of the aforementioned compounds, can be continuously added during the polymerization, in cases where asymmetrical coupling is desired. This continuous addition is normally done in a reaction zone separate from the zone where the bulk of the polymerization is occurring. The coupling agent can be added in a hydrocarbon solution, for example, cyclohexane, to the polymerization admixture with suitable mixing for distribution and reaction. The coupling agent will typically be added only after a high degree of conversion has already been attained. For instance, the coupling agent will normally be added only after a monomer conversion of greater than about 85 percent has been realized. It will typically be preferred for the monomer conversion to reach at least about 90 percent before the coupling agent is added. Common halide coupling agents include tin tetrachloride, tin tetrabromide, tin tetrafluoride, tin tetraiodide, silicon tetrachloride, silicon tetrabromide, silicon tetrafluoride, silicon tetraiodide, tin and silicon trihalides or tin and silicon dihalides can also be used. Polymers coupled with tin or silicon tetrahalides have a maximum of four arms (or four coupled polymer chains), tin and silicon trihalides have a maximum of three arms and tin and silicon dihalides have a maximum of two arms. Hexahalo disilanes or hexahalo disiloxanes can also be used as coupling agents resulting in polymers with a maximum of six arms. Useful tin and silicon halides coupling agents include: $SnCl_4$, $(R_1)_3SnCl$, $(R_1)_2SnCl_2$, $R_1SnCl_3$, $SiCl_4$, $(R_1)_3SiCl$, $(R_1)_2SiCl_2$, $R_1SiCl_3$, $Cl_3Si-SiCl_3$, $Cl_3Si-O-SiCl_3$, $Cl_3Sn-SnCl_3$, $Cl_3Sn-O-SnCl_3$. Examples of tin and silicon alkoxides coupling agents include: $Sn(OMe)_4$, $Si(OMe)_4$, $Sn(OEt)_4$ or $Si(OEt)_4$. The most preferred coupling agents are: $SnCl_4$, $SiCl_4$, $Sn(OMe)_4$ and $Si(OMe)_4$.

In one embodiment, the chain end modified elastomeric polymer further comprises at least one coupling agent, selected from the group consisting of tin halide, tin alkoxide, silicon halide, and silicon alkoxide.

A combination of a tin or silicon compound, as described before, can optionally be used to couple the polymer. By using such a combination of tin and silicon coupling agents, improved properties for tire rubbers, such as lower hysteresis, can be attained. It is particularly desirable to utilize a combination of tin and silicon coupling agents in tire tread compounds that contain both silica and carbon black. In such cases, the molar ratio of the tin to the silicon compound employed in coupling the elastomeric polymer will normally be within the range of 20:80 to 95:5; more typically 40:60 to 90:10, and preferably 60:40 to 85:15. Most typically, a range of about 0.01 to 4.5 milliequivalents of coupling agent (tin and silicon compound) is employed per 100 grams of the elastomeric polymer. It is normally preferred to utilize about 0.01 to about 1.5 milliequivalents of the coupling agent per 100 grams of polymer to obtain the desired Mooney viscosity. The larger quantities tend to produce polymers containing terminally reactive groups or insufficient coupling. Between zero and less than one equivalent of tin and/or silicon coupling group per equivalent of lithium initiator is used to enable subsequent functionalization of the remaining living polymer fraction. For instance, if a tin or silicon tetrachloride, or a mixture of these compounds, is used as the coupling agent, between 0 and less than 1.0 mol, preferably between 0 and 0.8 mol, and more preferably between 0 and 0.6 mol, of the coupling agent is utilized for every 4.0 moles of live lithium polymer chain ends. The coupling agent can be added in a hydrocarbon solution, e.g. in cyclohexane, to the polymerization admixture in the reactor with suitable mixing for distribution and reaction.

For solution based polymerization processes, the polymerization is conducted in a suitable solvent, dispersion agents or diluent. Non-coordinating, inert liquids are preferred, including, but not limited to, straight and branched-chain hydrocarbons, such as propane, butane, isobutane, pentane, hexane, heptane, octane, cyclic and alicyclic hydrocarbons, such as cyclohexane, cycloheptane, methylcyclohexane, methylcycloheptane, aromatic and alkyl-substituted aromatic compounds, such as benzene, toluene, and xylene, and isomers of the foregoing, and mixtures thereof, as well as pentamethyl heptane or mineral oil fractions, such as light or regular petrol, naphtha, kerosene or gas oil. Fluorinated hydrocarbon fluids, such as perfluorinated $C_{4-10}$ alkanes are also suitable. Further, suitable solvents, including liquid olefins, which may act as monomers or comonomers in the polymerization process, including propylene, 1-butene, 1-pentene, cyclopentene, 1-hexene, 3-methyl-1-pentene, 4-methyl-1-pentene, butadiene, isoprene, 1,4-hexadiene, 1,7-octadiene, 1-octene, 1-decene, styrene, divinylbenzene, ethylidenenorbornene, allylbenzene, 2-methylstyrene, 3-methylstyrene, 4-methylstyrene, 4-vinylcyclohexene, and vinylcyclohexane. Mixtures of the solvents are also suitable. Aromatic hydrocarbons, for instance benzene and toluene, can also be used.

The terms "chain end modifier", "end cap modifier", "modifying agent", "modifying compound", and simply "modifier" are all intended to mean the subject silane-sulfide compounds described herein, with reference to Formulae 1 and 2 below. The terms "chain end modified elastomeric polymer" and "modified elastomeric polymer" are both intended to mean the reaction product of a living elastomeric polymer with a subject chain end modifier.

The subject modifier includes compounds according to Formula 1:

$$GJMSi-A-S—SiTXZ \quad \text{(Formula 1)},$$

wherein:

Si is silicon; S is sulfur; G is $(C_1-C_{16})$ alkoxy, preferably a $(C_1-C_{10})$ alkoxy, more preferably a $(C_1-C_6)$ alkoxy, and even more preferably a $(C_1-C_4)$ alkoxy; and J and M are the same or different, and are each independently selected from the group consisting of: hydrogen (H), $(C_1-C_{16})$ alkyl, $(C_1-C_{16})$ alkoxy, $(C_7-C_{16})$ aryl, $(C_7-C_{16})$ alkylaryl, and -A-S—SiTXZ (where A, T, X and Z are defined below); but are preferably independently selected from $(C_1-C_5)$ alkyl and $(C_1-C_5)$ alkoxy.

A is an aryl, an alkylaryl, a $(C_7-C_{16})$ alkylaryl, or a $(C_1-C_{16})$ alkyl which may be linear or branched, saturated or unsaturated and may be substituted with: $(C_1-C_4)$ alkyl, $(C_1-C_4)$ alkoxy, $(C_7-C_{16})$ aryl, $(C_7-C_{16})$ aralkyl, nitrile, amine, $NO_2$, thioalkyl, -A-S—SiTXZ (where A, T, X and Z are defined herein), but is preferably a linear or branched $(C_1-C_5)$ alkyl.

In a preferred embodiment, A is a $(C_1-C_{16})$ alkyl, more preferably a $(C_1-C_{12})$ alkyl, even more preferably a $(C_1-C_8)$ alkyl, and most preferably a $(C_1-C_5)$ alkyl. In another embodiment, A is a $(C_7-C_{16})$ alkylaryl, more preferably a $(C_7-C_{12})$ alkylaryl, most preferably a $(C_7-C_{10})$ alkylaryl. The designations, $(C_1-C_n)$ or $(C_7-C_n)$, where n is the upper carbon limit, as used herein, refers to the total number of carbon atoms within the "A" group.

In another embodiment, A is preferably a $(C_1-C_{16})$ alkyl that does not contain a heteroatom, such as O, N, P or S, and more preferably a $(C_1-C_{12})$ alkyl that does not contain a heteroatom, such as O, N, P or S, even more preferably a $(C_1-C_8)$ alkyl that does not contain a heteroatom, such as O, N, P or S, and most preferably a $(C_1-C_5)$ alkyl that does not contain a heteroatom, such as O, N, P or S. In another embodiment, A is a $(C_7-C_{16})$ alkylaryl that does not contain a heteroatom, such as O, N, P or S, more preferably a $(C_7-C_{12})$ alkylaryl that does not contain a heteroatom, such as O, N, P or S, and most preferably a $(C_7-C_{10})$ alkylaryl that does not contain a heteroatom, such as O, N, P or S. As discussed above, the designations, $(C_1-C_n)$ or $(C_7-C_n)$, where n is the upper carbon limit, as used herein, refers to the total number of carbon atoms within the "A" group.

In a preferred embodiment, the A group, when an alkyl, contains three to five carbon atoms.

Examples of $(C_7-C_8)$ alkylaryl based A groups include the following structures:

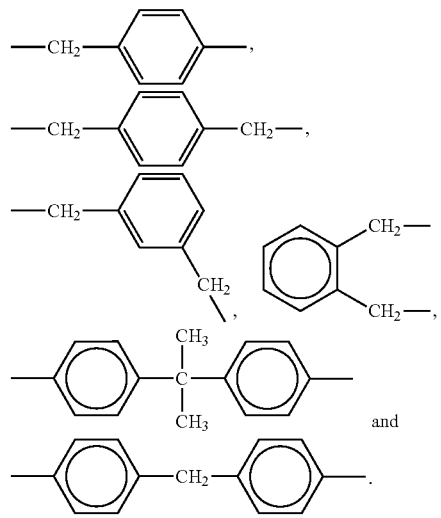

The T, X and Z groups are the same or different, and are each independently selected from the group consisting of: hydrogen (H), $(C_1-C_{16})$ alkyl, $(C_1-C_{16})$ alkoxy, $(C_7-C_{16})$ aryl, $(C_7-C_{16})$ aralkyl, and —S-A-SiMJG (A, M, J and G are defined as described herein), but preferably T, X and Z are independently selected from $(C_1-C_5)$ alkyl and $(C_1-C_5)$ alkoxy, and more preferably T, X and Z are each a $(C_1-C_5)$ alkyl group. In another embodiment, T, X and Z are each independently a $(C_1-C_{16})$ alkyl, more preferably a $(C_1-C_{12})$ alkyl, even more preferably a $(C_1-C_8)$ alkyl, and most preferably a $(C_1-C_5)$ alkyl.

While not shown in Formula 1, it will be understood that the subject compounds may also include their corresponding Lewis base adducts (for example, with solvent molecules tetrahydrofurane, dieethylether, dimethoxyethane coordinated with silicon atoms).

In a preferred embodiment of the invention, the modifier as depicted in Formula 1 (see above) and Formula 2 (see below) does not contain a halide moiety, and more preferably does not contain chloride, which can potentially form corrosive by-products.

The term "alkyl" is understood to include both straight chain hydrocarbons, (for example, methyl (Me), ethyl (Et), n-propyl (Pr), n-butyl (Bu), n-pentyl, n-hexyl, etc.), branched hydrocarbon groups (e.g. isopropyl, tert-butyl, etc.) and hydrocarbon based non-aromatic rings. These hydrocarbon groups may be optionally substituted with alkyl, alkoxy, hydroxyl, or other heteroatoms, such as nitrogen, sulfur and phosphorous, but preferably do not contain heteroatom-containing substitutions.

The term "alkoxy" is understood to include methoxy (MeO), ethoxy (EtO), propoxy (PrO), butoxy (BuO), isopropoxy, isobutoxy, pentoxy, and the like.

The term "aryl" is understood to include phenyls, biphenyls and other benzenoid compounds, optionally substituted with alkyl, alkoxy, hydroxyl, or other heteroatoms, such as nitrogen, sulfur and phosphorous. The aryl groups as defined in Formula 1, preferably contain no heteroatom substitution, and even more preferably contain only one aromatic ring, and most preferably contain a six carbon aromatic ring.

The term "alkylaryl" is understood to mean an aryl group bonded to an alkyl group. The designation of $(C_7-C_{16})$ and similar designations, are intended to mean the total number of carbon atoms within the group. The alkylaryl groups as defined in Formula 1 preferably contain no heteroatom substitution, and even more preferably contain only one aromatic ring, and most preferably contain a six carbon aromatic ring.

More preferably, the subject modifier is selected from the class defined by Formula 2:

$$(RO)_x(R)_ySi-R'-S-SiR_3 \quad \text{(Formula 2)},$$

wherein:

O is oxygen, x is an integer selected from 1, 2 and 3; y is an integer selected from 0, 1, and 2; x+y=3.

R is the same or different and is: $(C_1-C_{16})$ alkyl, preferably $(C_1-C_8)$ alkyl and more preferably $(C_1-C_5)$ alkyl especially including: Me, Et, Pr and Bu; and R' is $(C_1-C_{16})$ alkyl, preferably $(C_1-C_5)$ alkyl.

R' is equivalent to the "A" group, and is thus defined accordingly, as discussed above.

In a preferred embodiment, each R group is the same or different, and each is independently a $(C_1-C_5)$ alkyl, and R' is $(C_1-C_5)$ alkyl.

While not shown in Formula 2, it will be understood that the subject compounds include their corresponding Lewis base adducts (e.g. with solvent molecules tetrahydrofurane, dieethylether, dimethoxyethane coordinated with silicon atoms). Specific preferred species of the subject modifier include the compounds (and their corresponding Lewis base adducts which are not shown) represented by the following formulae:

$(MeO)_3Si-(CH_2)_3-S-SiMe_3$, $(EtO)_3Si-(CH_2)_3-S-SiMe_3$, $(PrO)_3Si-(CH_2)_3-S-SiMe_3$, $(BuO)_3Si-(CH_2)_3-S-SiMe_3$, $(MeO)_3Si-(CH_2)_2-S-SiMe_3$, $(EtO)_3Si-(CH_2)_2-S-SiMe_3$, $(PrO)_3Si-(CH_2)_2-S-SiMe_3$, $(BuO)_3Si-(CH_2)_2-S-SiMe_3$, $(MeO)_3Si-CH_2-S-SiMe_3$, $(EtO)_3Si-CH_2-S-SiMe_3$, $(PrO)_3Si-CH_2-S-SiMe_3$, $(BuO)_3Si-CH_2-S-SiMe_3$, $(MeO)_3Si-CH_2-CMe_2-CH_2-S-SiMe_3$, $(EtO)_3Si-CH_2-CMe_2-CH_2-S-SiMe_3$, $(PrO)_3Si-CH_2-CMe_2-CH_2-S-SiMe_3$, $(BuO)_3Si-CH_2-CMe_2-CH_2-S-SiMe_3$, $((MeO)_3Si-CH_2-C(H)Me-CH_2-S-SiMe_3$, $(EtO)_3Si-CH_2-C(H)Me-CH_2-S-SiMe_3$, $(PrO)_3Si-CH_2-C(H)Me-CH_2-S-SiMe_3$, $(BuO)_3Si-CH_2-C(H)Me-CH_2-S-SiMe_3$, $(MeO)_2(Me)Si-(CH_2)_3-S-SiMe_3$, $(EtO)_2(Me)Si-(CH_2)_3-S-SiMe_3$, $(PrO)_2(Me)Si-(CH_2)_3-S-SiMe_3$, $(BuO)_2(Me)Si-(CH_2)_3-S-SiMe_3$, $(MeO)_2(Me)Si-(CH_2)_2-S-SiMe_3$, $(EtO)_2(Me)Si-(CH_2)_2-S-SiMe_3$, $(PrO)_2(Me)Si-(CH_2)_2-S-SiMe_3$, $(BuO)_2(Me)Si-(CH_2)_2-S-SiMe_3$, $(MeO)_2(Me)Si-CH_2-S-SiMe_3$, $(EtO)_2(Me)Si-CH_2-S-SiMe_3$, $(PrO)_2(Me)Si-CH_2-S-SiMe_3$, $(BuO)_2(Me)Si-CH_2-S-SiMe_3$, $(MeO)_2(Me)Si-CH_2-CMe_2-CH_2-S-SiMe_3$, $(EtO)_2(Me)Si-CH_2-CMe_2-CH_2-S-SiMe_3$, $(PrO)_2(Me)Si-CH_2-CMe_2-CH_2-S-SiMe_3$, $(BuO)_2(Me)Si-CH_2-CMe_2-CH_2-S-SiMe_3$, $((MeO)_2(Me)Si-CH_2-C(H)Me-CH_2-S-SiMe_3$, $(EtO)_2(Me)Si-CH_2-C(H)Me-CH_2-S-SiMe_3$, $(PrO)_2(Me)Si-CH_2-C(H)Me-CH_2-S-SiMe_3$, $(BuO)_2(Me)Si-CH_2-C(H)Me-CH_2-S-SiMe_3$, $(MeO)(Me)_2Si-(CH_2)_3-S-SiMe_3$, $(EtO)(Me)_2Si-(CH_2)_3-S-SiMe_3$, $(PrO)Me)_2Si-(CH_2)_3-S-SiMe_3$, $(BuO)(Me)_2Si-(CH_2)_3-S-SiMe_3$, $(MeO)(Me)_2Si-(CH_2)_2-S-SiMe_3$, $(EtO)(Me)_2Si-(CH_2)_2-S-SiMe_3$, $(PrO)(Me)_2Si-(CH_2)_2-S-SiMe_3$, $(BuO)(Me)_2Si-(CH_2)_2-S-SiMe_3$, $(MeO)(Me)_2Si-CH_2-S-SiMe_3$, $(EtO)(Me)_2Si-CH_2-S-SiMe_3$, $(PrO)(Me)_2Si-CH_2-S-SiMe_3$, $(BuO)(Me)_2Si-CH_2-S-SiMe_3$, $(MeO)(Me)_2Si-CH_2-CMe_2-CH_2-S-SiMe_3$, $(EtO)(Me)_2Si-CH_2-CMe_2-CH_2-S-SiMe_3$, $(PrO)(Me)_2Si-CH_2-CMe_2-CH_2-S-SiMe_3$, $(BuO)(Me)_2Si-CH_2-CMe_2-CH_2-S-SiMe_3$, $((MeO)(Me)_2Si-CH_2-C(H)Me-CH_2-S-SiMe_3$, $(EtO)(Me)_2Si-CH_2-C(H)Me-CH_2-S-SiMe_3$, $(PrO)(Me)_2Si-CH_2-C(H)Me-CH_2-S-SiMe_3$, $(BuO)(Me)_2Si-CH_2-C(H)Me-CH_2-S-SiMe_3$, $(MeO)_3Si-(CH_2)_3-S-SiEt_3$, $(EtO)_3Si-(CH_2)_3-S-SiEt_3$, $(PrO)_3Si-(CH_2)_3-S-SiEt_3$, $(BuO)_3Si-(CH_2)_3-S-SiEt_3$, $(MeO)_3Si-(CH_2)_2-S-SiEt_3$, $(EtO)_3Si-(CH_2)_2-S-SiEt_3$, $(PrO)_3Si-(CH_2)_2-S-SiEt_3$, $(BuO)_3Si-(CH_2)_2-S-SiEt_3$, $(MeO)_3Si-CH_2-S-SiEt_3$, $(EtO)_3Si-CH_2-S-SiEt_3$, $(PrO)_3Si-CH_2-S-SiEt_3$, $(BuO)_3Si-CH_2-S-SiEt_3$, $(MeO)_3Si-CH_2-CMe_2-CH_2-S-SiEt_3$, $(EtO)_3Si-CH_2-CMe_2-CH_2-S-SiEt_3$, $(PrO)_3Si-CH_2-CMe_2-CH_2-S-SiEt_3$, $(BuO)_3Si-CH_2-CMe_2-CH_2-S-SiEt_3$, $((MeO)_3Si-CH_2-C(H)Me-CH_2-S-SiEt_3$, $(EtO)_3Si-CH_2-C(H)Me-CH_2-S-SiEt_3$, $(PrO)_3Si-CH_2-C(H)Me-CH_2-S-SiEt_3$, $(BuO)_3Si-CH_2-C(H)Me-CH_2-S-SiEt_3$, $(MeO)_2(Me)Si-(CH_2)_3-S-SiEt_3$, $(EtO)_2(Me)Si-(CH_2)_3-S-SiEt_3$, $(PrO)_2(Me)Si-(CH_2)_3-S-SiEt_3$, $(BuO)_2(Me)Si-(CH_2)_3-S-SiEt_3$, $(MeO)_2(Me)Si-(CH_2)_2-S-SiEt_3$, $(EtO)_2(Me)Si-(CH_2)_2-S-SiEt_3$, $(PrO)_2(Me)Si-(CH_2)_2-S-SiEt_3$, $(BuO)_2(Me)Si-(CH_2)_2-S-SiEt_3$, $(MeO)_2(Me)Si-CH_2-S-SiEt_3$, $(EtO)_2(Me)Si-CH_2-S-SiEt_3$, $(PrO)_2(Me)Si-CH_2-S-SiEt_3$, $(BuO)_2(Me)Si-CH_2-S-SiEt_3$, $(MeO)_2(Me)Si-CH_2-CMe_2-CH_2-S-SiEt_3$, $(EtO)_2(Me)Si-CH_2-CMe_2-CH_2-S-SiEt_3$, $(PrO)_2(Me)Si-CH_2-CMe_2-CH_2-S-SiEt_3$, $(BuO)_2(Me)Si-CH_2-CMe_2-CH_2-S-SiEt_3$, $((MeO)_2(Me)Si-CH_2-C(H)Me-CH_2-S-SiEt_3$, $(EtO)_2(Me)Si-CH_2-C(H)Me-CH_2-S-SiEt_3$, $(PrO)_2(Me)Si-CH_2-C(H)Me-CH_2-S-SiEt_3$, $(BuO)_2(Me)Si-CH_2-C(H)Me-CH_2-S-SiEt_3$, $(MeO)(Me)_2Si-(CH_2)_3-S-SiEt_3$, $(EtO)(Me)_2Si-(CH_2)_3-S-SiEt_3$, $(PrO)Me)_2Si-(CH_2)_3-S-SiEt_3$, $(BuO)(Me)_2Si-(CH_2)_3-S-SiEt_3$, $(MeO)(Me)_2Si-(CH_2)_2-S-SiEt_3$, $(EtO)(Me)_2Si-(CH_2)_2-S-SiEt_3$, $(PrO)(Me)_2Si-(CH_2)_2-S-SiEt_3$, $(BuO)(Me)_2Si-(CH_2)_2-S-SiEt_3$, $(MeO)(Me)_2Si-CH_2-S-SiEt_3$, $(EtO)(Me)_2Si-CH_2-S-SiEt_3$, $(PrO)(Me)_2Si-CH_2-S-SiEt_3$, $(BuO)(Me)_2Si-CH_2-S-SiEt_3$, $(MeO)(Me)_2Si-CH_2-CMe_2-CH_2-S-SiEt_3$, $(EtO)(Me)_2Si-CH_2-CMe_2-CH_2-S-SiEt_3$, $(PrO)(Me)_2Si-CH_2-CMe_2-CH_2-S-SiEt_3$, $(BuO)(Me)_2Si-CH_2-CMe_2-CH_2-S-SiEt_3$, $((MeO)(Me)_2Si-CH_2-C(H)Me-CH_2-S-SiEt_3$, $(EtO)(Me)_2Si-CH_2-C(H)Me-CH_2-S-SiEt_3$, $(PrO)(Me)_2Si-CH_2-C(H)Me-CH_2-S-SiEt_3$, and $(BuO)(Me)_2Si-CH_2-C(H)Me-CH_2-S-SiEt_3$, $(MeO)_3Si-(CH_2)_3-S-SiMe_2{}^tBu$, $(EtO)_3Si-(CH_2)_3-S-SiMe_2{}^tBu$, $(PrO)_3Si-(CH_2)_3-S-SiMe{}^tBu$, $(BuO)_3Si-(CH_2)_3-S-SiMe_2{}^tBu$, $(MeO)_3Si-(CH_2)_2-S-SiMe_2{}^tBu$, $(EtO)_3Si-(CH_2)_2-S-SiMe_2{}^tBu$, $(PrO)_3Si-(CH_2)_2-S-SiMe_2{}^tBu$, $(BuO)_3Si-(CH_2)_2-S-SiMe_2{}^tBu$, $(MeO)_3Si-CH_2-S-SiMe_2{}^tBu$, $(EtO)_3Si-CH_2-S-SiMe_2{}^tBu$, $(PrO)_3Si-CH_2-S-SiMe_2{}^tBu$, $(BuO)_3Si-CH_2-S-SiMe_2{}^tBu$, $(MeO)_3Si-CH_2-CMe_2-CH_2-S-SiMe_2{}^tBu$, $(EtO)_3Si-CH_2-CMe_2-CH_2-S-SiMe_2{}^tBu$, $(PrO)_3Si-CH_2-CMe_2-CH_2-S-SiMe_2{}^tBu$, $(BuO)_3Si-CH_2-CMe_2-CH_2-S-SiMe_2{}^tBu$, $((MeO)_3Si-CH_2-C(H)Me-CH_2-S-SiMe_2{}^tBu$, $(EtO)_3Si-CH_2-C(H)Me-CH_2-S-SiMe_2{}^tBu$, $(PrO)_3Si-CH_2-C(H)Me-CH_2-S-SiMe_2{}^tBu$, $(BuO)_3Si-CH_2-C(H)Me-CH_2-S-SiMe_2{}^tBu$, $(MeO)_2(Me)Si-(CH_2)_3-S-SiMe_2{}^tBu$, $(EtO)_2(Me)Si-(CH_2)_3-S-SiMe_2{}^tBu$, $(PrO)_2(Me)Si-(CH_2)_3-S-SiMe_2{}^tBu$, $(BuO)_2(Me)$ Si—(CH₂)₃—S—SiMe₂ᵗBu, (MeO)₂(Me)Si—(CH₂)₂—S—SiMe₂ᵗBu, (EtO)₂(Me)Si—(CH₂)₂—S—SiMe₂ᵗBu, (PrO)₂(Me)Si—(CH₂)₂—S—SiMe₂ᵗBu, (BuO)₂(Me)Si—(CH₂)₂—S—SiMe₂ᵗBu, (MeO)₂(Me)Si—CH₂—S—SiMe₂ᵗBu, (EtO)₂(Me)Si—CH₂—S—SiMe₂ᵗBu, (PrO)₂(Me)Si—CH₂—S—SiMe₂ᵗBu, (BuO)₂(Me)Si—CH₂—S—SiMe₂ᵗBu, (MeO)₂(Me)Si—CH₂—CMe₂-CH₂—S—SiMe₂ᵗBu, (EtO)₂(Me)Si—CH₂—CMe₂-CH₂—S—SiMe₂ᵗBu, (PrO)₂(Me)Si—CH₂—CMe₂-CH₂—S—SiMe₂ᵗBu, (BuO)₂(Me)Si—CH₂—CMe₂-CH₂—S—SiMe₂ᵗBu, ((MeO)₂(Me)Si—CH₂—C(H)Me-CH₂—S—SiMe₂ᵗBu₃, (EtO)₂(Me)Si—CH₂—C(H)Me-CH₂—S—SiMe₂ᵗBu, (PrO)₂(Me)Si—CH₂—C(H)Me-CH₂—S—SiMe₂ᵗBu, (BuO)₂(Me)Si—CH₂—C(H)Me-CH₂—S—SiMe₂ᵗBu, (MeO)(Me)₂Si—(CH₂)₃—S—SiMe₂ᵗBu, (EtO)(Me)₂Si—(CH₂)₃—S—SiMe₂ᵗBu, (PrO)Me)₂Si—(CH₂)₃—S—SiMe₂ᵗBu, (BuO)(Me)₂Si—(CH₂)₃—S—SiMe₂ᵗBu, (MeO)(Me)₂Si—(CH₂)₂—S—SiMe₂ᵗBu, (EtO)(Me)₂Si—(CH₂)₂—S—SiMe₂ᵗBu, (PrO)(Me)₂Si—(CH₂)₂—S—SiMe₂ᵗBu, (BuO)(Me)₂Si—(CH₂)₂—S—SiMe₂ᵗBu, (MeO)(Me)₂Si—CH₂—S—SiMe₂ᵗBu, (EtO)(Me)₂Si—CH₂—S—SiMe₂ᵗBu, (PrO)(Me)₂Si—CH₂—S—SiMe₂ᵗBu, (BuO)(Me)₂Si—CH₂—S—SiMe₂ᵗBu, (MeO)(Me)₂Si—CH₂—CMe₂-CH₂—S—SiMe₂ᵗBu, (EtO)(Me)₂Si—CH₂—CMe₂-CH₂—S—SiMe₂ᵗBu, (PrO)(Me)₂Si—CH₂—CMe₂-CH₂—S—SiMe₂ᵗBu, (BuO)(Me)₂ Si—CH₂—CMe₂-CH₂—S—SiMe₂ᵗBu, ((MeO)(Me)₂Si—CH₂—C(H)Me-CH₂—S—SiMe₂ᵗBu, (EtO)(Me)₂Si—CH₂—C(H)Me-CH₂—S—SiMe₂ᵗBu, (PrO)(Me)₂Si—CH₂—C(H)Me-CH₂—S—SiMe₂ᵗBu, and (BuO)(Me)₂Si—CH₂—C(H)Me-CH₂—S—SiMe₂ᵗBu, The modifiers of the present invention may be prepared by reacting a sulfur containing compound according to Formula 3:

$$(RO)_x(R)_ySi—R'—S—H \quad \text{(Formula 3)}$$

wherein the symbols have the same meaning as defined with respect to Formula 2, with a compound according to Formula 4:

$$QSiR_3 \quad \text{(Formula 4)},$$

wherein Q is fluorine, chlorine or bromine atom.

The subject modifier includes the sulfanylsilane compounds described in U.S. Pat. No. 6,229,036 (which, to the fullest extent permitted by law, is incorporated herein by reference, including the methods for preparing sulfanylsilane compounds). Of the sulfanylsilane compounds disclosed, those without halogens are preferred.

The modifier may be added intermittently (or at regular or irregular intervals) or continuously during the polymerization, but is preferably added at a conversion rate of the polymerization of more than 80%, and more preferably at a conversion rate of more than 90%. Preferably, a substantial amount of the polymer chain ends are not terminated prior to the reaction with the modifier; that is, the living polymer chain ends are present and capable of reacting with the modifier in a polymer chain end modification reaction. The modification reaction may be before, after or during the addition of a coupling agent (if used). Preferably the modification reaction is completed after the addition of the coupling agent (if used). In some embodiments, more than a third of the polymer chain ends are reacted with a coupling agent(s) prior to addition of the modifier. In some embodiments, no coupling agent is used and the living polymer chains are reacted with the modifier. In the course of the modification reaction one or more than one polymer chain can react with the modifier. As result one or more than one polymer chain is linked to the functionality derived from the modifier compound. The modifier may be directly added into the polymer solution without dilution; however, it may be beneficial to provide addition of the modifier in solution, such as an inert solvent (e.g. cyclohexane). The amount of modifier added to the polymerization varies depending upon the monomer species, modifier species, reaction conditions, and desired end properties, but is generally from 0.05 to 5 mol-equivalent, preferably from 0.1 to 2.0 mol-equivalent and most preferably from 0.2 to 1.5 mol-equivalent per mol equivalent of alkali metal in the organic alkali metal compound required as initiator for the polymerization. The modification reaction may be carried out in a temperature range of 0° C. to 150° C., preferably between 15° C. and 100° C., and even more preferably between 25° C. and 80° C. There is no limitation for the duration of the functionalization reaction, however with respect to an economical polymerization process, the modification reaction is usually stopped about 10 to 60 minutes after the addition of the modifier.

The chain end modification reaction is believed to result in a chain end modified elastomeric polymer represented by Formula 5:

$$(D)_z(RO)_x(R)_ySi—R'—S—SiR_3 \quad \text{(Formula 5)},$$

wherein D is an elastomeric polymer, x is an integer selected from 0, 1 and 2; y is an integer selected from 0, 1, and 2; z is an integer selected from 1, 2 and 3, and x+y+z=3, and all other symbols are as previous defined with respect to Formula 2. While not shown in Formula 5, it will be understood that the subject compound(s) include their corresponding Lewis base adducts. In some preferred embodiments, the chain end modified polymer may be partially coupled via reaction with the aforementioned coupling agent(s).

While not wishing to be bound by theory, the trialkylsilyl (—SiR₃) group of Formula 5 is believed to function as a protective group which prevents unintended subsequent reaction. This "protective" trialkylsilyl (—SiR₃) may be removed by exposure to a compounds containing —OH groups such water, alcohols, anionic acids or organic acids, (e.g. hydrochloric acid, sulfuric acid or carboxylic acids), thus forming an "un-protected" thiol (—SH) group. Such conditions are typically present during vulcanization. Depending on the polymer "work up" conditions, both the unprotected and/or protected modified elastomeric polymers may be present. For example, steam stripping of the polymer solution containing the modified polymer according to Formula 5 will remove a percentage of the protecting trialkyl silyl groups resulting in the unprotected form with the thiol (—SH) group exposed. Alternatively, a water-free work up procedure can enable the preparation of the modified polymers according to Formula 5.

While not wishing to be bound by theory, it is believed that the unprotected thiol (—SH) group of the modified elastomeric polymer is reactive with both unsaturated portions of the polymer backbone, and fillers (such as silica and/or carbon black) present. This interaction is believed to result in the formation of bonds, or in the case of some fillers, electrostatic interactions which result in more homogeneous distribution of filler within an elastomeric polymer compositions.

The resulting modified elastomeric polymer preferably comprises sulfide groups (e.g. thiol) in the amount from 0.0010 to 0.20 or 0.0020 to 0.20 mmol/gram of elastomeric polymer, preferably from 0.0010 to 0.10 mmol/gram, and more preferably from 0.0025 to 0.1 mmol/gram, and even more preferably from 0.0025 to 0.05 or 0.0030 to 0.05 mmol/gram of polymer. In another embodiment, the sulfide groups are present in an amount less than, or equal to, 0.20 mmol/gram of elastomeric polymer, preferably less than, or equal to, 0.10 mmol/gram, and more preferably less than, or equal to, 0.05 mmol/gram. In another embodiment, the sulfide groups are present in an amount greater than, or equal to, 0.0010 mmol/gram of elastomeric polymer, preferably greater than, or equal to, 0.0020 mmol/gram, and more preferably greater than, or equal to, 0.0030 mmol/gram.

For most applications, the modified polymer is preferably a homopolymer derived from a conjugated diolefin, a copolymer derived from a conjugated diolefin monomer with an aromatic vinyl monomer, and/or a terpolymer of one or two types of conjugated diolefins with one or two types of aromatic vinyl compounds. More preferably, the modified polymer is a copolymer of a conjugated diolefin monomer with an aromatic vinyl monomer, e.g. a copolymer of butadiene with styrene with a sulfide group (e.g. thiol) bonded to at least some polymer chain ends.

Preferred chain end modified polymers (or modified elastomeric polymers) include, but are not limited to, chain end modified polybutadiene, chain end modified polyisoprene, chain end modified butadiene-styrene copolymers, chain end modified butadiene-isoprene copolymers, chain end modified isoprene-styrene copolymers and chain end modified butadiene-isoprene-styrene terpolymers. Of the aforementioned polymers (or elastomeric polymers) chain end modified polybutadiene and chain end modified butadiene-styrene copolymers are especially preferred.

Although there are no specific limitations regarding the content of 1,2-bond and/or 3,4-bonds (hereinafter called "vinyl bonds") of the conjugation diolefin portion of the elastomeric polymer, for most applications the vinyl bond content is preferably from 10 to 90 weight percent, and particularly preferably from 15 to 80 weight percent. If the vinyl bond content in an elastomeric polymer is less than 10 weight percent, the resulting product may have inferior wet skid resistance. If the vinyl content in the elastomeric polymer exceeds 90 weight percent vinyl bonds, the product may exhibit compromised tensile strength and abrasion resistance, and relatively large hysteresis loss.

Although there are no specific limitation regarding the amount of aromatic vinyl monomer used in the subject modified elastomeric polymer, in most applications the aromatic vinyl monomers comprise from 5 to 60 weight percent of the total monomer content, and more preferably from 10 to 50 weight percent. Values less than S weight percent can lead to reduced wet skid properties, abrasion resistance, and tensile strength; whereas values more than 60 weight percent lead to increased hysteresis loss. The modified elastomeric polymer may be a block or random copolymer, but preferably 40 weight percent or more of the aromatic vinyl compound units are linked singly, and 10 weight percent or less are of "blocks" in which eight or more aromatic vinyl compounds are linked successively. The length of successively linked aromatic vinyl units can be measured by an ozonolysis-gel permeation chromatography method developed by Tanaka, et al. (Polymer, Vol. 22, Pages 1721-1723 (1981)).

While dependant upon the specific polymer and desired end use application, the inventive modified polymers, as final bulk polymer reaction product, prior to rubber compounding and vulcanization processes, preferably have Mooney viscosity values (ML 1+4, 100° C., as measured in accordance with ASTM D 1646 (2004)) in the range from 20 to 150, and preferably from 30 to 100, using a Monsanto MV2000 instrument. Modified polymers may optionally include filler and/or oil and/or other polymers. If the Mooney viscosity (ML 1+4, 100° C.) is less than 20, abrasion resistance and hysteresis loss properties are compromised. Moreover, tack and cold flow of the elastomeric polymer are increased, resulting in difficult handling, poor green strength and poor storage stability. If the Mooney viscosity (ML 1+4, 100° C.) of the polymer is more than 150, processability (filler incorporation and heat build up in the internal mixer, banding on the roll mill, extrusion rate, extrudate dimensional stability. smoothness, etc.) is impaired and the cost of processing increases.

In one embodiment of the invention, the modified polymer, as final bulk polymer reaction product, prior to rubber compounding and vulcanization processes, contains an oil, and has a Mooney Viscosity (ML 1+4, 100° C., as measured in accordance with ASTM D 1646 (2004), as discussed above) in the range from 20 to 150, and preferably from 30 to 100. In another embodiment, the modified polymer, as final bulk polymer reaction product, prior to rubber compounding and vulcanization processes, does not contain filler or oil, and has a Mooney Viscosity (ML 1+4, 100° C., as measured in accordance with ASTM D 1646 (2004), as discussed above) in the range from 20 to 150, and preferably from 30 to 100.

The preferred molecular weight distribution of the subject modified polymer, as final bulk polymer reaction product, prior to rubber compounding and vulcanization processes, and prior to the addition of oil, filler or a second elastomeric polymer source, represented by the ratio of the weight average molecular weight to the number average molecular weight, (Mw/Mn), ranges preferably from 1.3 to 3.0. Processability of the polymer is impaired if the Mw/Mn is less than 1.3. Poor processability not only increases cost of production, but also impairs blending characteristics of components, such as insufficient dispersion of fillers and other additives, which may result in poor physical properties. If Mw/Mn is more than 3.0, the content of low molecular weight components increases and hysteresis loss increases.

The inventive modified polymers (or modified elastomeric polymers) may contain a combination of two or more features or embodiments as described herein. To the aforementioned, especially preferred modified polymers are as follows:

1) modified polybutadiene in a Mooney range of 30 to 80 and a vinyl bond content ranging from 5 to 30 weight percent, based on the conjugation diolefin portion of the modified elastomeric polymer as discussed above,
2) modified polybutadiene in a Mooney range of 30 to 80 and a vinyl bond content ranging from 45 to 80 weight percent, based on the conjugation diolefin portion of the modified elastomeric polymer as discussed above,
3) modified butadiene-styrene copolymer in a Mooney range from 45 to 80, a vinyl bond content ranging from 50 to 80 weight percent, based on the conjugation diolefin portion of the modified elastomeric polymer as defined above, and a styrene content of 15 to 30 weight percent (in the copolymer), having 50 weight percent or more of the styrene units linked singly, and 10 weight percent or less linked to "blocks" of eight or more styrene units, and
4) modified butadiene-styrene copolymer in a Mooney range from 45 to 80, a vinyl bond content ranging from 5 to 50 weight percent, based on the conjugation diolefin portion of the modified elastomeric polymer as discussed above, and a styrene content of 30 to 55 weight percent (in the copolymer), having 40 weight percent or more of the styrene units linked singly, and 10 weight percent or less linked to "blocks" of eight or more styrene units.

Mooney viscosity is measured as discussed above.

Extension oils may be used in combination with the subject elastomeric polymers to reduced viscosity or Mooney values. The invention provides for compositions comprising a chain end modified elastomeric polymer and an oil. Applicable extender oils include mineral oils which are mixtures of aromatic-type oil, alicyclic-type oil, and aliphatic-type oil, and are classified as an aromatic-type extender oil, alicyclic-type extender oil, or aliphatic-type extender oil. Among these, aromatic-type mineral oil having a viscosity gravity constant (V.G.G. value) of 0.900-1.049 (aromatic oil) and an alicyclic-type mineral oil having a V.G.G. value of 0.850-0.899 (naphthenic oil) are particularly preferable to ensure optimal low temperature hysteresis loss properties resulting in excellent wet skid resistance. Such extension of modified polymer of the subject invention with extender oil ensures homogeneous dispersion of fillers such as carbon black and silica in the polymer, and improves processability and various properties of vulcanized products. The amount of extender oil used in the present invention is from 0 to 100 parts by weight, preferably from 0 to 80 parts by weight, and more preferably from 0 to 70 parts by weight, for 100 parts by weight modified elastomeric polymer, as final bulk polymer reaction product, prior to rubber compounding and vulcanization processes. When the extender oil is added to the polymer solution, the timing of addition should be after modification of the polymer or termination of the polymerization, for example, after the addition of the modifier or polymerization termination agent. After the addition of extender oil, the oil-extended polymer is obtained by separating the polymer from solvent by a direct drying method or steam stripping, drying the rubber using a vacuum dryer, hot-air dryer, roller, or the like. By way of example, US 2005/0159513 published on Jul. 31, 2005 discloses an oil extended rubber composition comprising a solution-polymerized elastomeric polymer coupled with a silicon or tin coupling agent, and a low polycyclic aromatic oil.

In an important embodiment of the present invention, the subject modified polymer is combined and reacted with filler(s) and vulcanization agent, and optionally additional constituents, including, but not limited to, accelerators, coupling agents, and unmodified elastomeric polymers (i.e. conventional elastomeric polymers that have not been reacted with the subject modifier but that have been prepared and terminated as is conventional in the art). The term "elastomeric polymer composition" is intended to describe the reaction product resulting from this combination. The resulting elastomeric polymer composition it typically molded into a desired configuration and vulcanized to elastomeric article, such as a tire.

The subject modified elastomeric polymer or polymers (include oil extended embodiments) preferably comprises at least 30 weight percent of the total elastomeric polymer present, and more preferably at least 50 weight percent. The remaining portion of the elastomeric polymer is unmodified elastomeric polymer. Preferred unmodified elastomeric polymers include: cis-1,4-isoprene polymer, natural rubber, 3,4-isoprene to polymer, styrene/butadiene copolymer polymer, styrene/isoprene/butadiene terpolymer, cis-1,4-butadiene polymer, trans-1,4-butadiene polymer, low to high vinyl butadiene polymers (having a vinyl content of 10-90 percent), acrylonitrile/butadiene copolymers, and chloroprene polymers. Of these, styrene-butadiene copolymer, natural rubbers, polyisoprene, and polybutadiene are preferable. It is desirable that the unmodified polymers have a Mooney viscosity (ML 1+4, 100° C.) in the range from 20 to 200, and preferably from 25 to 150 (measured in accordance with ASTM D 1646 (2004) as discussed above). The addition of unmodified polymers in the above range ensures manufacturing of the elastomeric composition of the present invention at a low cost without substantially impairing its characteristics.

The subject elastomeric composition preferably includes fillers which serve as reinforcement agents. Carbon black, silica, carbon-silica dual-phase-filler, clay, calcium carbonate, magnesium carbonate, and the like are examples. Of these, the combined use of carbon black and silica, the use of carbon-silica dual-phase-fillers alone, or the combined use of carbon-silica dual-phase-filler and carbon black and/or silica are preferable. Carbon black is manufactured by a furnace method and having a nitrogen adsorption specific surface area of 50-200 $m^2/g$ and DBP oil absorption of 80-200 ml/100 grams, for example, FEF; HAF, ISAF, or SAF class carbon black, is preferable. High agglomeration type carbon black is particularly preferable. Carbon black is typically added in an amount from 2 to 100 parts by weight, and preferably from 5 to 100 parts by weight, more preferably 10 to 100 parts by weight and even more preferably 10 to 95 parts by weight, for 100 parts by weight of the total elastomeric polymer.

Examples of silica fillers include: wet process silica, dry process silica, and synthetic silicate-type silica. Silica with a small particle diameter exhibits a high reinforcing effect. Small diameter, high agglomeration-type silica (i.e. that having a large surface area and high oil absorptivity) exhibits excellent dispersability in the elastomeric polymer composition, representing desirable properties, and superior processability. An average particle diameter of silica, in terms of a primary particle diameter, is preferably from 5 to 60 µm, and more preferably from 10 to 35 µm. Moreover, the specific surface area of the silica particles (measured by the BET method) is preferably from 45 to 280 $m^2/g$. Silica is added in an amount from 10 to 100 parts by weight, preferably 30 to 100 parts by weight, and even more preferably from 30 to 95 parts by weight, for 100 parts by weight of the total elastomeric polymer.

Carbon black and silica may be added together; in which case the total amount of carbon black and silica added is from 30 to 100 parts by weight, and preferably from 30 to 95 parts by weight for 100 parts by weight of the total elastomeric polymer. So long as such fillers are homogeneously dispersed in the elastomeric composition, increasing quantities (within the above cited ranges) result in compositions having excellent rolling and extruding processability, and vulcanized products exhibiting favorable hysteresis loss properties, rolling resistance, improved wet skid resistance, abrasion resistance, and tensile strength.

Carbon-silica dual-phase-filler may be used either independently or in combination with carbon black and/or silica in the present invention. Carbon-silica dual-phase-filler can exhibit the same effects as those obtained by the combined use of carbon black and silica, even in the case where this is added alone. Carbon-silica dual-phase-filler is so called silica-coating-carbon black made by coating silica over the surface of carbon black, and is commercially available under the trademark CRX2000, CRX2002, or CRX2006 (products of Cabot Co.). Carbon-silica dual-phase-filler is added in the same amounts as previously described with respect to silica. Carbon-silica dual-phase-filler can be used in combinations with other fillers, e.g. carbon black, silica, clay, calcium carbonate, and magnesium carbonate. Of these fillers, use of carbon black and silica, either individually or in combination, is preferable.

It is preferable to add a silane coupling agent to the polymer composition when silica or carbon-silica dual-phase-filler is used. The typical amount of a silane coupling agent added is from about 1 to about 20 parts by weight, and preferably from 5 to 15 parts by weight, for 100 parts by weight of the total amount of silica and/or carbon-silica dual-phase-filler. A silane coupling agent, which has both a functional group reactive with silica surface such as for example but not limited to an alkoxysilyl group and a functional group reactive with a carbon-carbon double bond of polymer such as polysulfide group, mercapto group, or epoxy group in the molecule is preferable including: bis-(3-triethoxysilylpropyl)tetrasulfide, bis-(3-triethoxysilylpropyl)disulfide, bis-(2-triethoxysilylethyl)tetrasulfide, bis-(2-triethoxysilylethyl)disulfide, 3-mercaptopropyltrimethoxysilane, 3-triethoxysilyipropyl-N,N-dimethylthiocarbamoyltetrasulfide, 3-triethoxysilylpropylbenzothiazole tetrasulfide, 3-octanoylthio-1-propyltriethoxysilane (NXT silane, ©Crompton Corporation). Additional examples are described in U.S. 2006/0041063A, incorporated herein by reference. The use of such a silane coupling agent increases the reinforcing effect brought about by the combined use of carbon black and/or silica or the use of carbon-silica dual-phase-filler.

In one embodiment of the invention, the modified polymer (or modified elastomeric polymer) contains a vulcanizing agent and/or a vulcanizing accelerator. Sulfur-containing compounds and peroxides are the most common vulcanizing agents. A vulcanizing accelerator of sulfene amide-type, guanidine-type, or thiuram-type can be used together with a vulcanizing agent, as required. Other additives such as zinc white, vulcanization auxiliaries, aging preventives, processing adjuvants, and the like may be optionally added. A vulcanizing agent is typically added to the polymer composition in an amount from 0.5 to 10 parts by weight, and preferably from 1 to 6 parts by weight, for 100 parts by weight of the total elastomeric polymer. Additional information regarding vulcanizing agents can be found in Kirk-Othmer, Encyclopedia of Chemical technology $3^{rd}$, Ed, Wiley Interscience, N.Y. 1982, volume 20, pp. 365-468, specifically "Vulcanizing Agents and Auxiliary Materials" pp. 390-402.

In one embodiment an inventive vulcanized elastomeric polymer composition comprises from 10 to 100 parts by weight filler, and from 0.5 to 10 parts by weight of vulcanization agent, both based upon 100 parts by weight of total elastomeric polymer in the composition.

In another embodiment, the invention provides a tire tread comprising, or formed from, an inventive vulcanized elastomeric polymer composition. In yet another embodiment, the invention provides a tire comprising at least one component formed from an inventive vulcanized elastomeric polymer composition.

The elastomeric polymer composition of the present invention can be prepared by kneading the above-described modified elastomeric polymers (including oil extended varieties), unmodified elastomeric polymers (including oil extended varieties), fillers (carbon black, silica, carbon-silica dual-phase-filler, etc.), silane coupling agents, and other additives in a kneader at 140 to 180° C. After cooling, vulcanizing agents such as sulfur, vulcanizing accelerators, and the like are added, and the resulting mixture is blended using a Banbury mixer or open roll mill, formed into a desired shape, and vulcanized at 140 to 180° C., thereby obtaining a vulcanized elastomeric product.

Because the vulcanized elastomeric polymer compositions of the present invention exhibit low rolling resistance, low dynamic heat build up and superior wet skid performance, the elastomeric polymer compositions of the present invention are well suitably for use in preparing tires, tire treads, side walls, and carcasses, as well as other industrial products such as belts, hoses, vibration-proof rubber, and footwear.

The present invention will be explained in more detail by way of examples, which are not intended to be limiting of the present invention.

EXAMPLES

The following Examples are provided in order to further illustrate the invention and are not to be construed as limiting.

The Examples include the preparation of the subject modifiers along with comparative modifiers, the preparation and testing of modified elastomeric polymers and the preparation and testing of elastomeric polymer compositions. Unless stated to the contrary, all parts and percentages are expressed on a weight basis. The term "overnight" refers to a time of approximately 16-18 hours and "room temperature" refers to a temperature of about 20-25° C. The polymerizations were performed under exclusion of moisture and oxygen in a nitrogen atmosphere. Various methods were used to test and measure Examples. A brief description of these techniques is provided.

The ratio between the 1,4-cis-, 1,4-trans- and 1,2-polydiene content of the butadiene or isoprene polymers was determined by IR, $^1$H-NMR- and $^{13}$C-NMR-spectroscopy (NMR (Avance 400 device ($^1$H=400 MHz; $^{13}$C=100 MHz) of Bruker Analytic GmbH). The vinyl content in the conjugated diolefin part was additionally determined by IR absorption spectrum (Morello method, IFS 66 FT-IR spectrometer of Bruker Analytic GmbH). The IR samples were prepared using $CS_2$ as swelling agent.

Bonded styrene content: A calibration curve was prepared by IR absorption spectrum (IR (IFS 66 FT-IR spectrometer of Bruker Analytik GmbH). The IR samples were prepared using $CS_2$ as swelling agent.). The styrene content was alternatively determined by NMR technique (NMR (Avance 400 device ($^1$H=400 MHz; $^{13}$C=100 MHz) of Bruker Analytik GmbH)).

A single chain aromatic vinyl compound unit (a unit with an aromatic vinyl compound linked singly) and a long chain aromatic vinyl compound unit (a unit in which eight or more aromatic vinyl compounds are linked) was determined by NMR technique (NMR (Avance 400 device ($^1$H=400 MHz; $^{13}$C=100 MHz) of Bruker Analytik GmbH)). Particularly, the total styrene block content was determined through $^1$H-NMR analysis of the signals in the area from 6.2 to 6.9 ppm, reflecting all styrene blocks with more than three styrene units (n≧3). The styrene micro blocks with n=3-5 correspond to the signals in the area from 6.7 to 6.9 ppm and the long blocks with n>6 and n=6 correspond to the signals from 6.2 to 6.7 ppm.

Molecular weight distribution (Mw/Mn) was determined from the ratio of polystyrene-reduced weight average molecular weight (Mw) and number average molecular weight (Mn), which were measured by gel permeation chromatograph (SEC with viscosity detection (universal calibration) in THF at room temperature). Mp1 and Mp2 correspond to the molecular weight measured at the first and second maximum peaks of the GPC curve, respectively, of the uncoupled molecular weight fraction.

The glass transition ($T_g$) temperatures were determined by DSC determination. DSC (differential scanning calorimetry) was measured using a DSC 2920 of TA Instruments.

Mooney viscosity was measured according to ASTM D 1646 (2004) with a preheating time of 1 minute and a rotor operation time of 4 minutes at a temperature of 100° C. [ML1+4(100° C.)].

Modification efficiency with sulfanylsilanes was determined via (—SiMe$_3$) group and (—Si—OMe) group concentration by NMR technique (NMR (Avance 400 device ($^1$H=400 MHz; $^{13}$C=100 MHz) of Bruker Analytic GmbH). (—Si—OMe) signal at 3.3-3.5. ppm and (—SiMe$_3$) signal at 0.1-0.2 ppm. To determine the modification efficiency with an alkoxy group containing sulfanylsilane compound in percent, the value was divided by the number average molecular weight (Mn) measured by GPC, as the measured value is the amount of the Si—C bond per unit weight.

Modification efficiency with sulfanylsilanes was also determined via sulfur content as sulfate. The procedure required combustion of the sample in an automatic oven (Combustor 02 of the company GAMAB, Germany, Bad Dürrenberg) followed by absorption of the flue gas in water with 0.1% hydrazinium hydroxide and subsequent determination of the sulfate concentration with ion chromatography (Metrohm, column: Dionex IonPac AS12A).

Tensile strength, elongation at break and modulus at 300% elongation (Modulus 300) were measured according to ASTM D 412 on a Zwick Z010.

Heat build up was measured according to ASTM D 623, method A, on a Doli 'Goodrich'-Flexometer.

Tan δ (60° C.) was measured using the dynamic spectrometer Eplexor 150N manufactured by Gabo Qualimeter Testanlagen GmbH (Germany) applying a compression dynamic strain of 0.2% at a frequency of 2 Hz at 60° C. The smaller the index, the lower is the rolling resistance (lower=better). Tan δ (0° C.) was measured using the same equipment and load conditions at 0° C. The larger the index, the better the wet skid resistance (higher=better).

DIN abrasion was measured according to DIN 53516. The larger the index, the lower the wear resistance is (lower=better).

Measurement of un-vulcanized rheological properties according to ASTM D 5289 using a rotor-less shear rheometer (MDR 2000 E) to measure Scorch Time (TS) and Time to Cure (TC). The "TC 50" and "TC 90" are the respective times required to achieve 50 percent and 90 percent conversion of the vulcanization reaction. "TS 1" and "TS 2" are: the respective times required to increase the torque by 1 dNm and 2 dNm above the respective torque minimum (ML) during vulcanization.

In general, the higher the value for Elongation at Break, Tensile Strength, Modulus 300, and Tan δ at 0° C., the better; whereas the lower the Tan δ at 60° C., Heat Build up, and Abrasion, the better. Preferably TS 1 is >1.5 minute, TS 2 is >2.5 minute, TC 50 is from 3 to 8 minutes, and TC 90 is from 8 to 19 minutes.

Modifier Preparation: Four modifiers were used in the Examples. The structural formula and method of preparation (or source for obtaining) are provided below. Modifiers 1 and 2 are representative of those of the present invention, whereas modifiers 3 and 4 are for comparative purposes.

Modifier 1 is represented by Formula M1 below, and was prepared as follows:

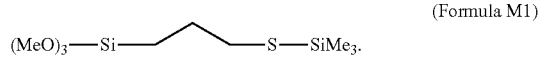

(Formula M1)

A 250 mL Schlenk flask was charged with 100 g cyclohexane, 8.6 g (85 mmol) triethylamine and 13.12 g (80 mmol) gamma-mercaptopropyl trimethoxy silane [Silquest A-189] from the Cromton GmbH. 17.9 g (165 mmol) trimethyl chloro silane were diluted with 50 g cyclohexane and the resulting solution is then added drop wise to the Schlenk flask. Immediately a white triethylammonium chloride precipitated. The suspension was stirred for about 24 hours at room temperature, and for another three hours at 60° C. The white precipitate was subsequently separated by filtration. The resulting colorless solution was distilled in the vacuum to yield 16 g (67.7 mmol) of modifier 1.

Modifier 2 is represented by Formula M2 below and was prepared as follows:

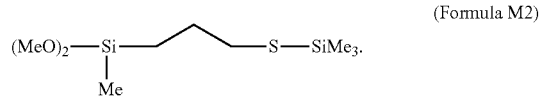

(Formula M2)

A 250 mL Schlenk flask was charged with 100 g cyclohexane, 8.6 g (85 mmol) triethylamine and 14.4 g (79.8 mmol) gamma-mercaptopropyl (methyl) dimethoxysilane from the ABCR GmbH. 17.4 g (160 mmol) trimethyl chloro silane were diluted with 50 g cyclohexane, and the resulting solution is then added drop wise to the Schlenk flask. Immediately a white triethylammonium chloride precipitated. The suspension was stirred for about 24 hours at room temperature and for another three hours at 60° C. The white precipitate was subsequently separated by filtration. The resulting colorless solution was distilled in the vacuum to yield 17.2 g (68.1 mmol) of modifier 2.

Modifier 3 is represented by Formula M2 below and was prepared as follows:

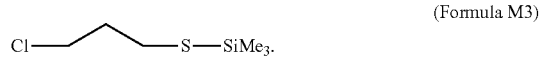

(Formula M3)

A 250 mL Schlenk flask was charged with 100 g cyclohexane, 8.6 g (85 mmol) triethylamine and 8.85 g (80.0 mmol) gamma-mercaptopropyl chloride from the Aldrich GmbH. 17.4 g (160 mmol) trimethyl chloro silane were diluted with 50 g cyclohexane and the resulting solution is then added drop wise to the Schlenk flask. Immediately a white triethylammonium chloride precipitated. The suspension was stirred for about 24 hours at room temperature and for another three hours at 60° C. The white precipitate was subsequently separated by filtration. The resulting colorless solution was distilled in the vacuum to yield 11.9 g (65.3 mmol) of modifier 3.

Modifier 4 is represented by Formula M4 below and was prepared as follows:

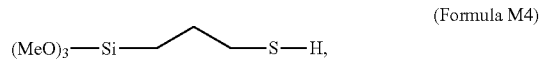

(Formula M4)

Gamma-mercaptepropyl trimethoxy silane 4 [Silquest A-189] from the Cromton GmbH.

Modifier 1 represented by Formula M1 above alternatively was prepared as follows:

100 mL Schlenk flask was charged with 25 ml tetrahydrofuran (THF), 79.5 mg (10 mmol) lithium hydrid and subsequently with 1.80 g (10 mmol) gamma-mercaptopropyl trimethoxy silane [Silquest A-189] from the Cromton GmbH. The reaction mixture was stirred for 24 hours at room temperature and another two hours at 50° C. Than 1.09 g (10 mmol) trimethyl chloro silane were diluted with 10 g THF and the resulting solution is then added drop wise to the Schlenk flask. Lithium chloride precipitated. The suspension was stirred for about 24 hours at room temperature, and for another two hours at 50° C. The THF solvent was removed in the vacuum (vacuum?). Than 30 ml cyclohexane are added. The white precipitate was subsequently separated by filtration. The cyclohexane•solvent was removed in the vacuum (under reduced pressure). The resulting colorless liquid solution proved to be 99 percent pure per GC and therefore no further purification was necessary.

2.2 g (9.2 mmol) of modifier 1 were obtained.

Modifier 1 represented by Formula M1 above alternatively was prepared as follows:

100 mL Schlenk flask was charged with 1.80 g (10 mmol) gamma-mercaptopropyl trimethoxy silane [Silquest A-189] from the Cromton GmbH, 25 ml tetrahydrofuran (THF) and subsequently with 0.594 g (11 mmol) sodium methanolate (NaOMe) dissolved in 10 mL THF. The reaction mixture was stirred for 18 hours at room temperature. Than 1.09 g (10 mmol) trimethyl chloro silane were diluted with 10 g THF, and the resulting solution is then added drop wise to the Schlenk flask. Sodium chloride precipitated. The suspension was stirred for about 24 hours at room temperature, and for another two hours at 50° C. The THF solvent was removed in the vacuum. Than 30 ml cyclohexane are added. The white precipitate was subsequently separated by filtration. The cyclohexane solvent was removed in the vacuum (under reduced pressure). The resulting colorless liquid solution proved to be 89% pure per GC. Further purification consisted in a fractionated distillation.

1.7 g (7.2 mmol) of modifier 1.

Homopolymerization of 1,3-Butadiene

Examples 1/1a and 2/2a

Polymerizations for Examples 1/1a and 2/2a were performed in a double wall two liter steel reactor which was purged with nitrogen before the addition of organic solvent, monomers, polar coordinator compound, initiator compound or other components. The polymerization reactor was tempered to 50° C., unless stated otherwise. The following components were than added in the following order: cyclohexane solvent (500 grams); tetramethylethylene diamine (TMEDA) (45.0 mmol) as polar coordinator compound, butadiene monomer, and the mixture was allowed to stir for one hour. N-butyl lithium (50.0 mmol) was added to start the polymerization reaction. The polymerization was performed at 50° C. for approximately 2 hours, after which time, a part of the polymer solution was removed from the reactor, and separately worked up as described below. Subsequently, the modifier (1 or 2) was added. For Examples 1a and 2a, no modifier was added. For the termination of the polymerization process, the polymer solution was transferred after one hour into a separate double wall steel reactor containing 50 mL methanol, and Irganox 1520 as stabilizer for the polymer (1 Liter of methanol contained two grams of Irganox). This mixture was stirred for 15 minutes. The polymerization solvent and other volatiles were then removed via vacuum.

Examples 1 & 1a

The polymerization reaction was performed using 54.1 g (1.00 mol) butadiene. After the removal of 66.6% of the polymer solution, 5.91 grams (25.0 mmol) of modifier 1 was added to the polymerization reactor. The same preparation was used for Example 1a, except that no modifier as added.

Examples 2 & 2a

The polymerization reaction was performed using 10.0 g (0.185 mol) butadiene. After the removal of 50% of the polymer solution, 12.5 mmol of modifier 2 was added to the polymerization reactor. The same preparation was used for Example 2a, except that no modifier as added.

TABLE 1

| Ex | Modifier | Mw g/mol | Mn g/mol | Mp1 g/mol | Mp2 g/mol | Tg ° C. | Vinyl content mol % | —S content mmol/g polybuta- diene | —OMe content mol % | —SiMe$_3$ content mmol/g polybuta- diene |
|---|---|---|---|---|---|---|---|---|---|---|
| 1 | 1 | 4,560 | 3,460 | 2,230 | 4,550 | −51.8 | 63.1 | 0.20 | 0.0 | 0.17 |
| 1a | none | 2,350 | 2,080 | 2,230 | NP* | −58.0 | 66.1 | 0.0 | 0.0 | 0.0 |
| 2 | 2 | 930 | 575 | 520 | 1500 | | 49.5 | 0.83 | 0.1 | 0.89 |
| 2a | none | 520 | 430 | 540 | NP* | | 51.5 | 0.0 | 0.0 | 0.0 |

*NP = Not present.

The GC-MS investigation of Example 2 confirmed the existence of trimethyl silyl groups (—SiMe$_3$) (m/e=73) exemplary in three different polymer fractions, at retention times of 13.17 minutes, 13.25 minutes and 22.04. The (—SiMe$_3$) fragment was found in the majority of the polymer fractions indicating the existence of at least one (—SiMe$_3$) group in the majority of the polymer chains.

As a separate study, effective removal of the (—SiMe$_3$) protective group was demonstrated by first preparing hexadecyl-trimethylsilyl-sulfide, followed by the removal of (—SiMe$_3$) group with HCl. More specifically, 5.1 g (20 mmol) hexadecylthiol was dissolved in 25 mL cyclohexane. Triethylamine, 2.15 g (21.25 mmol) was then added followed by 4.47 g (41.25 mmol) chloro-trimethyl-silane in 25 mL cyclohexane. The resulting reaction mixture was stirred for 24 hours, and than heated at 60° C. for three hours. The resulting solution was filtrated, and the cyclohexane solvent removed via vacuum. Hexadecyl-trimethylsilyl-sulfide was formed, (yield: 6.6 g (20.0 mmol)). The (—SiMe$_3$) group was confirmed via NMR spectroscopy (signal appeared in the $^1$H-NMR spectra at 0.23 ppm). Hexadecyl-trimethylsilyl-sulfide, 1 gram (mmol), was dissolved in 15 mL cyclohexane, and 2 grams hydrochloric acid (36%) in 10 mL ethanol were added and stirred for 15 hours at room temperature. After removal of the organic layer through phase separation and extraction, the organic phase was dried using magnesium sulfate and filtrated. Removal of the organic solvent, and most of the formed hexachlorodisiloxane side product, via vacuum led to the isolation of hexadecylthiol. As expected, the (—SiMe$_3$) signal in the $^1$H-NMR spectra at 0.23 ppm disappeared and a new (—SiMe$_3$) signal of very low intensity at 0.13 ppm appeared indicating the presence of a hexachlorodisiloxane side product.

Copolymerization of 1,3-Butadiene with Styrene

Examples 3-18

The co-polymerizations were performed in a double wall 20 liter steel reactor, which was first purged with nitrogen before the addition of organic solvent, monomers, polar coordinator compound, initiator compound or other components. The polymerization reactor was tempered to 40° C. unless stated otherwise. The following components were than added in the following order: cyclohexane solvent (9000 grams); butadiene monomer, styrene monomer, tetramethylethylene diamine (TMEDA), and the mixture was stirred for one hour followed by titration with n-butyl lithium to remove traces of moisture or other impurities. Additional n-butyl lithium was added as to start the polymerization reaction. The polymerization was performed for 80 minutes, not allowing the polymerization temperature to exceed 60° C. Afterwards, 0.5% of the total butadiene monomer amount was added followed by the addition of tin tetrachloride unless stated otherwise. The mixture was stirred for 20 minutes. Subsequently, 1.8% of the total butadiene monomer amount was added, followed by the addition of modifier (1, 2, 3 or 4) unless stated otherwise. For the termination of the polymerization process, the polymer solution was transferred after 45 minutes into a separate double wall steel reactor containing 100 mL ethanol and 1.4 g of concentrated HCl (concentration 36%) and 5 g Irganox 1520 as stabilizer for the polymer. This mixture was stirred for 15 minutes. The resulting polymer solution was than stripped with steam for one hour to remove solvent and other volatiles, and dried in an oven at 70° C. for 30 minutes and another one to three days at room temperature.

The resulting polymer composition and several attributes are summarized in Tables 2 and 3 below. Unless otherwise stated, quantities are expressed in mmols. Examples prepared under identical polymerization conditions (in the same polymerization reactor on the same day by the same operator) are designated with identical letters adjacent to the Example number (e.g. 3A, 4A).

The use of a dash "-" in the tables below indicates that no constituent was added. The abbreviation "N.M." is intended to mean that no measurement was taken or that corresponding data was unavailable.

TABLE 2

| | | Composition of Examples | | | | |
|---|---|---|---|---|---|---|
| Example | Modifier | Tin tetra-chloride | butadiene (moles) | styrene (moles) | TMEDA | n-butyl lithium |
| 3A | (1) 14.54 | — | 29.18 | 4.03 | 20.3 | 11.58 |
| 4A | — | 0.912 | 29.07 | 4.03 | 20.3 | 11.57 |
| 5B | (1) 10.16 | 0.903 | 28.65 | 3.98 | 20.5 | 11.92 |
| 6B | — | 0.905 | 28.68 | 4.00 | 20.4 | 12.00 |
| 7C | (2) 10.16 | 0.905 | 28.66 | 3.99 | 20.3 | 10.22 |
| 8C | — | 0.909 | 28.59 | 4.01 | 20.3 | 10.13 |
| 9D | (1) 14.54 | — | 28.94 | 4.00 | 20.3 | 13.39 |
| 10D | (2) 14.54 | — | 28.94 | 4.00 | 20.3 | 12.90 |
| 11D | — | 0.905 | 28.68 | 4.00 | 20.3 | 12.55 |
| 12 | (2) 10.16 | 0.911 | 28.99 | 4.01 | 20.6 | 12.33 |
| 13E | (1) 14.54 | — | 29.16 | 4.03 | 20.8 | 12.61 |
| 14E | (3) 14.154 | 0.916 | 28.94 | 4.00 | 20.7 | 12.41 |
| 15E | — | 0.916 | 28.94 | 4.00 | 20.7 | 12.31 |
| 16 | (4) 10.16 | 0.910 | 28.97 | 4.01 | 20.7 | 11.63 |
| 17 | (4) 10.16 | — | 29.27 | 4.01 | 20.8 | 12.98 |
| 18 | — | 0.912 | 28.96 | 4.01 | 20.7 | 11.54 |

TABLE 3

| | | Polymer Attributes | | | | | | |
|---|---|---|---|---|---|---|---|---|
| Example | Modifier | Mw | Mn | Mp1 | Tg [° C.] | Mooney viscosity | Vinyl content | Styrene content |
| 3A | 1 | 377,580 | 298,201 | 262,163 | −26.1 | 63.2 | 62.6 | 20.8 |
| 4A | — | 421,181 | 291,149 | 267,668 | −27.8 | 50.1 | 62.8 | 20.6 |
| 5B | 1 | 496,873 | 342,581 | 250,450 | −24.6 | 72.6 | 62.4 | 21.0 |
| 6B | — | 385,665 | 274,553 | 249,431 | −24.7 | 42.7 | 63.1 | 21.1 |
| 7C | 2 | 494,999 | 323,521 | 292,319 | −24.1 | 71.0 | 62.4 | 21.2 |
| 8C | — | 495,724 | 309,278 | 294,782 | −29.0 | 69.8 | 21.0 | 20.1 |
| 9D | 1 | 318,595 | 241,301 | 224,954 | −24.2 | 44.7 | 61.3 | 20.9 |
| 10D | 2 | 292,750 | 246,318 | 233,442 | −24.6 | 34.9 | 63.3 | 20.4 |
| 11D | — | 363,924 | 254,332 | 238,329 | −24.0 | 41.2 | 61.0 | 21.1 |
| 12 | 2 | 423,860 | 297,208 | 244,784 | −24.0 | 56.6 | 62.8 | 21.0 |
| 13E | 1 | 341,280 | 275,095 | 240,784 | −24.5 | 50.8 | 63.2 | 21.0 |
| 14E | 3 | 395,383 | 259,723 | 242,742 | −23.6 | 48.9 | 62.9 | 22.5 |
| 15E | — | 387,818 | 254,950 | 244,784 | N.M | 41.0 | 62.9 | 22.5 |
| 16 | 4 | 479,761 | 336,551 | 259,462 | −23.8 | 70.4 | 63.4 | 22.2 |
| 17 | 4 | 307,998 | 256,067 | 234,889 | −23.8 | 33.7 | 63.3 | 21.3 |
| 18 | — | 378,798 | 261,361 | 261,361 | N.M | 41.9 | 62.8 | 20.9 |

*N.M = Not Measured

The total styrene block content percentage for Examples 12-18 was ≦1%, with total long block content (greater than or equal to 5 repeat styrene units)≦5%, with the remainder being micro block content (from 2-4 repeating styrene units).

Polymer compositions were prepared by combining and compounding the constituents listed below Table 4, in a 350 cc Banbury mixer, and vulcanized at 160° C. for 20 minutes.

Vulcanization process data and physical properties for the each elastomeric composition example are provided in Tables 5 and 6.

TABLE 4

Polymer Composition

| Constituent | Amount (phr) |
|---|---|
| Elastomeric polymer Example (styrene butadiene copolymer) | 100 |
| IRB 7 (international ref. carbon black, Sid Richardson) | 50 |
| Stearic acid | 1.5 |
| Zinc oxide | 3.0 |
| Softner (aromatic oil) | 5.0 |
| Vulcanization Package: | |
| Sulfur | 1.75 |
| CBS (N-cyclohexyl-2-benzothiazylsulfenamid; Vulcacit CZ/EG, Bayer AG) | 1.0 |

Additional polymer compositions were prepared by combining and compounding the constituents listed below Table 7 in a 350 cc Banbury mixer and vulcanized at 160° C. for 20 minutes. Vulcanization process data and physical properties for the each elastomeric composition example are provided in Tables 8 and 9.

TABLE 7

Polymer Composition

| Constituent | Amount (phr) |
|---|---|
| Elastomeric polymer Example (styrene butadiene copolymer) | 80 |
| High cis 1,4-polybutadiene (Buna cis 132-BSL GmbH) | 20 |
| Precipitated silica (Ultrasil 7000 GR, Degussa-Hüls AG) | 80 |
| Silane (NXT silane, Degussa AG) | 9.7 |
| Stearic acid | 1.0 |
| Antiozonant (Dusantox 6 PPD (N-(1,3-dimethyl-butyl)-N'-phenyl-p-phenyllendiamin) Duslo) | 2.0 |

TABLE 5

Vulcanization Process Data

| Example | Modifier | TS 1 [min] | TS 2 [min] | TC 50 [min] | TC 90 [min] | Heat build up [° C.] | DIN abrasion 0.5 kg load [mm] |
|---|---|---|---|---|---|---|---|
| 3A | 1 | 3.75 | 5.49 | 7.31 | 14.33 | 88.7 | 162 |
| 4A | — | 4.41 | 6.33 | 8.50 | 15.87 | 99.7 | 161 |
| 5B | 1 | 4.86 | 5.94 | 7.77 | 14.90 | 89.6 | 152 |
| 6B | — | 4.68 | 6.54 | 8.78 | 16.32 | 101.3 | 164 |
| 7C | 2 | 4.20 | 5.73 | 7.72 | 15.26 | 87.0 | 151 |
| 8C | — | 4.32 | 6.48 | 8.71 | 15.9 | 94.1 | 157 |
| 9D | 1 | 4.35 | 5.49 | 7.24 | 14.26 | 91.7 | 141 |
| 10D | 2 | 4.35 | 5.34 | 7.02 | 14.14 | 89.7 | 130 |
| 11D | — | 4.68 | 6.54 | 8.80 | 16.48 | 100.5 | 157 |

TABLE 6

Polymer Composition Properties

| Ex. | Modifier | Coupling Agent (SnCl$_4$) | Elongation at break [%] | Tensile Strength [MPa] | Modulus 300 [MPa] | Tan δ at 0° C. | Tan δ at 60° C. | Temp. at Tan δ max [° C.] |
|---|---|---|---|---|---|---|---|---|
| 3A | 1 | — | 393 | 19.9 | 13.8 | 0.5312 | 0.0987 | −12.05 |
| 4A | — | Yes | 413 | 18.4 | 12.4 | 0.4745 | 0.1176 | −11.95 |
| 5B | 1 | Yes | 435 | 22.2 | 13.5 | 0.5965 | 0.0895 | −10.05 |
| 6B | — | Yes | 427 | 18.6 | 12.3 | 0.4703 | 0.1380 | −11.95 |
| 7C | 2 | Yes | 394 | 19.9 | 13.6 | 0.575 | 0.0933 | −12.05 |
| 8C | — | Yes | 384 | 17.7 | 12.7 | 0.5311 | 0.1130 | −12.05 |
| 9D | 1 | — | 418 | 21.1 | 13.6 | 0.5829 | 0.0961 | −11.85 |
| 10D | 2 | — | 424 | 20.3 | 13.1 | 0.5795 | 0.10591 | −11.65 |
| 11D | — | Yes | 447 | 19.5 | 11.7 | 0.5386 | 0.1191 | −10.85 |

TABLE 7-continued

Polymer Composition

| Constituent | Amount (phr) |
|---|---|
| Zinc oxide | 2.5 |
| Ozone protecting wax (Anitlux 654, Rhein Chemie Rheinau GmbH) | 1.5 |
| Softener (aromatic oil) | 20 |
| Vulcanization Package: | |
| Sulfur | 1.4 |
| CBS (N-cyclohexyl-2-benzothiazylsulfenamid; Vulcacit CZ/EG, Bayer AG) | 1.5 |
| DPG (diphenylguanidin, Vulkacit D, Lanxess Deutschland GmbH) | 1.5 |

TABLE 8

Vulcanization Process Data

| Example | Modifier | TS 1 [min] | TS 2 [min] | TC 50 [min] | TC 90 [min] | Heat build up [° C.] | DIN Abrasion 0.5 kg load [mm] |
|---|---|---|---|---|---|---|---|
| 3A | 1 | 3.13 | 4.40 | 6.15 | 13.66 | 91.7 | 101 |
| 4A | — | 3.32 | 3.98 | 5.70 | 15.10 | 115.6 | 108 |
| 5B | 1 | 3.67 | 4.52 | 6.15 | 14.09 | 98.2 | 122 |
| 6B | — | 3.36 | 3.99 | 5.66 | 15.20 | 122.6 | 135 |
| 7C | 2 | 3.34 | 4.26 | 5.99 | 14.08 | 101.6 | 98 |
| 8C | — | 3.20 | 3.90 | 5.49 | 13.89 | 112.6 | 96 |
| 9D | 1 | 3.57 | 4.61 | 6.24 | 13.77 | 97.5 | 116 |
| 10D | 2 | 3.24 | 4.15 | 5.74 | 13.34 | 97.1 | 109 |
| 11D | — | 3.42 | 4.05 | 5.77 | 15.81 | 123.6 | 111 |
| 12 | 2 | 2.91 | 3.77 | 5.53 | 14.38 | N.M. | 114 |
| 13E | 1 | 3.6 | 4.5 | 6.1 | 13.2 | N.M. | 108 |
| 14E | 3 | 3.7 | 4.4 | 6.3 | 15.3 | N.M. | 109 |
| 15E | — | 3.8 | 4.5 | 6.4 | 16.0 | N.M. | 108 |
| 16 | 4 | 3.12 | 3.82 | 5.54 | 14.62 | N.M. | 104 |
| 17 | 4 | 3.08 | 3.84 | 5.64 | 15.14 | N.M. | 132 |
| 18F | — | 3.15 | 3.78 | 5.46 | 15.38 | N.M. | 115 |
| *19F | 1 | 3.03 | 3.65 | 5.36 | 15.20 | N.M. | 114 |

*0.24 g (0.894 mmol) of Modifier 1 were added to 120 grams the polymer composition of Example 18 during compounding (i.e. after polymerization).

TABLE 9

Polymer Composition Properties

| Ex. | Modifier | Coupling Agent ($SnCl_4$) | Elongation at break [%] | Tensile Strength [MPa] | Modulus 300 [MPa] | Tan δ at 0° C. | Tan δ at 60° C. | Temp. at Tan δ max [° C.] |
|---|---|---|---|---|---|---|---|---|
| 3A | 1 | — | 492 | 22.8 | 10.2 | 0.2309 | 0.0845 | −21.95 |
| 4A | — | Yes | 561 | 19.0 | 7.8 | 0.2800 | 0.1413 | −21.95 |
| 5B | 1 | Yes | 472 | 20.8 | 10.2 | 0.2428 | 0.0951 | −21.95 |
| 6B | — | Yes | 590 | 19.0 | 7.7 | 0.2677 | 0.1609 | −15.15 |
| 7C | 2 | Yes | 503 | 21.8 | 9.8 | 0.2535 | 0.0968 | −21.95 |
| 8C | — | Yes | 543 | 20.0 | 8.1 | 0.2739 | 0.1329 | −21.95 |
| 9D | 1 | — | 463 | 21.2 | 10.5 | 0.2363 | 0.0898 | −21.95 |
| 10D | 2 | — | 471 | 21.4 | 10.7 | 0.2268 | 0.0888 | −22.05 |
| 11D | — | Yes | 600 | 18.6 | 6.9 | 0.2608 | 0.1600 | −23.75 |
| 12 | 2 | Yes | 499 | 20.8 | 9.25 | 0.2552 | 0.1009 | −21.95 |
| 13E | 1 | — | 470 | 19.9 | 9.4 | 0.2282 | 0.0876 | −22.08 |
| 14E | 3 | Yes | 573 | 19.0 | 7.8 | 0.2739 | 0.1614 | −21.85 |
| 15E | — | Yes | 591 | 18.1 | 6.8 | 0.2756 | 0.1709 | −21.95 |
| 16 | 4 | Yes | 514 | 18.7 | 8.2 | 0.2708 | 0.1269 | −22.05 |
| 17 | 4 | — | 540 | 18.4 | 7.9 | 0.2731 | 0.1342 | −21.75 |
| 18F | — | Yes | 576 | 18.7 | 7.1 | 0.2698 | 0.1632 | −21.85 |
| *19F | 1 | Yes | 592 | 18.6 | 7.1 | 0.2652 | 0.1598 | −24.05 |

*0.24 g (0.894 mmol) of Modifier 1 were added to 120 grams the polymer composition of Example 18 during compounding (i.e. after polymerization).

One important application of the present invention is the production of elastomeric polymer compositions having lower Tan δ at 60° C. values without negatively impacting other physical properties and processability, particularly Tan δ at 0° C. Tire treads made from elastomeric polymer compositions having lower Tan δ at 60° C. values have corresponding lower rolling resistance, while those with higher Tan δ at 0° C. values have corresponding better wet skid properties.

As means of illustrating the invention, living low molecular weight polybutadienes were used as a relatively simple model polymer. As shown in Table 1, polybutadienes of Examples 1a and 2a had molecular weights (Mw) of 2,350 and 520 g/mol respectively. These polymers did not contain modified polymer chains, i.e. neither trimethylsilyl (—$SiMe_3$) nor methoxy (—OMe) groups where present.

Similar polymers (Examples 1 and 2) were prepared and modified with Modifiers 1 and 2 pursuant to the subject invention. This modification resulted in a doubling of the average molecular weight (Mw), confirming the modification of polymer chains via the methoxy-silyl groups of the modifiers. As expected, few methoxy groups were detected in the $^1$H-NMR spectra. Both the investigation of Example 2 by GC-MS analysis and the investigation of Example 1 by pyrolysis-MS analysis lead to the identification of a trimethylsilyl (—SiMe$_3$) group as a fragment in the mass spectra at m/e=73.2. The molar concentration of sulfur and trimethylsilyl groups in each of the Examples is in the same range, i.e. about 26 percent of Modifier 1 was attached to the polymer chain ends in Example 1, while about 34 percent of the Modifier 2 was attached to the polymer chain ends of Example 2.

In order to demonstrate the potential effective removal of trimethylsilyl group from a trimethylsilylsulfido-group modified polymer, hexadecyl-trimethylsilyl-sulfide was selected as a model compound. As demonstrated above, hexadecyl-trimethylsilyl-sulfide was transformed quantitatively into hexadecylthiol after the exposure to hydrochloric acid at room temperature. It is believed that the existence of the trimethylsilyl group temporarily prevents (i.e. protects) the inactivation of a substantial amount of living polymer chain ends through reaction.

As previously stated, one significant application for the subject modified elastomeric polymers is their use in preparing elastomeric polymer compositions, and specifically tire treads, made therefrom, having low rolling resistance as represented by compositions having relatively low values for tan δ at 60° C., without significantly deterioration of wet skid properties as represented by tan δ at 0° C. As illustrated in Table 6, polymer compositions prepared from elastomeric polymers modified according to the present invention (i.e. with Modifier 1 or 2) had relatively lower δ at 60° C. and higher tan δ at 0° C. values, as compared to their counterpart Examples (designated by the same letter, e.g. 5A and 6A), prepared without such modification. Additionally, the Tensile Strength, Modulus 300, and Elongation at Break of the modified Examples were generally improved, or at least not significantly deteriorated.

As shown by Examples 18F and 19F, it is important that the subject living elastomeric polymers are modified with the subject modifiers, rather than simply adding the modifier to the elastomeric composition during the compounding step after the elastomeric polymers have been prepared and terminated. More specifically, as shown by the data in Table 9, the addition of Modifier 1, in comparable concentration as used for chain end modification, to the elastomeric composition after polymer termination, (as described in U.S. Pat. No. 6,229,036) had little impact on the values of tan δ at 60° C. or 0° C.

As shown in Table 6, Heat build up during vulcanization is reduced by use of the subject modified elastomeric polymers. This reduction is believed to improve the durability of the resulting composition, and to increase overall elasticity. Similarly, Tensile Strength and Modulus 300 are improved, suggesting the formation of a stable polymer network with a higher resistance under mechanical stress. Although Elongation at Break values are slightly reduced, they are still very acceptable considering the improved Tensile Strengths and Tan δ values.

Tables 5 and 8 show that scorch times (TS) and times to cure (TC) are comparable with unmodified polymers and have good processability.

It is particularly advantageous that aforementioned benefits were generally found with both carbon black containing polymer compositions as well as with silica containing polymer compositions.

The invention claimed is:

1. A chain end modified elastomeric polymer, comprising the reaction product of:
   i) a living anionic elastomeric polymer, and
   ii) a silane-sulfide modifier represented by the formula:

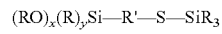
   (RO)$_x$(R)$_y$Si—R'—S—SiR$_3$ wherein:
   Si is silicon; S is sulfur; O is oxygen; x is an integer selected from 1, 2 and 3;
   y is an integer selected from 0, 1, and 2; x+y=3;
   R is the same or different and is (C$_1$-C$_{16}$) alkyl; and R' is aryl, and alkyl aryl, or (C$_1$-C$_{16}$) alkyl, and wherein the living anionic elastomeric polymer has a substantial amount of polymer chain ends that are not terminated prior to reaction with the modifier.

2. The chain end modified elastomeric polymer of claim 1, wherein R' is a (C$_1$-C$_{16}$) alkyl.

3. The chain end modified elastomeric polymer of claim 1, wherein each R group is the same or different, and each is independently a (C$_1$-C$_5$) alkyl, and wherein R' is (C$_1$-C$_5$) alkyl.

4. The chain end modified elastomeric polymer of claim 1, wherein the reaction product further comprises at least one coupling agent, selected from the group consisting of tin halide, tin alkoxide, silicon halide, and silicon alkoxide.

5. The chain end modified elastomeric polymer of claim 1, wherein the modified elastomeric polymer is selected from the group consisting of modified homopolymers of isoprene, modified homopolymers of butadiene, modified copolymers of butadiene with styrene, modified copolymers of isoprene with styrene, modified terpolymers butadiene with isoprene and styrene, and combinations thereof.

6. A vulcanized elastomeric polymer composition comprising the reaction product of the following:
   1) a filler;
   2) a vulcanization agent; and
   3) a chain end modified elastomeric polymer, and wherein the chain end modified elastomeric polymer is the reaction product of:
      i) a living anionic elastomeric polymer, and
      ii) a silane-sulfide modifier represented by the formula:

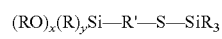
   (RO)$_x$(R)$_y$Si—R'—S—SiR$_3$ wherein:
   Si is silicon; S is sulfur; O is oxygen;
   x is an integer selected from 1, 2 and 3;
   y is an integer selected from 0, 1, and 2; x+y=3;
   R is the same or different and is: (C$_1$-C$_{16}$) alkyl; and R' is aryl, alkylaryl, or (C$_1$-C$_{16}$) alkyl,
   wherein the vulcanized composition exhibits a tan δ at 60° that is lower than the tan δ at 60° of a second vulcanized composition, the second vulcanized composition differing from the vulcanized composition in that the second composition contains an elastomeric polymer that is not chain end modified with the silane-sulfide modifier.

7. The composition of claim 6, wherein R' is a (C$_1$-C$_{16}$) alkyl.

8. The composition of claim 6, further comprising an oil.

9. The composition of claim 6, wherein each R group is the same or different, and each is a (C$_1$C$_5$) alkyl, and wherein R' is (C$_1$-C$_5$) alkyl.

10. The composition of claim 6, wherein the reaction product further comprises at least one coupling agent, selected from the group consisting of tin halide, tin alkoxide, silicon halide, and silicon alkoxide.

11. The composition of claim 6, wherein the filler comprises silica.

12. The composition of claim 6, wherein the filler comprises carbon black.

13. The composition of claim 6 wherein the chain end modified elastomeric polymer is selected from the group consisting of modified homopolymers of isoprene, modified homopolymers of butadiene, modified copolymers of butadiene with styrene, modified copolymers of isoprene with styrene, modified terpolymers butadiene with isoprene and styrene, and combinations thereof.

14. The composition of claim 6, comprising from 10 to 100 parts by weight filler, and from 0.5 to 10 parts by weight of vulcanization agent, both based upon 100 parts by weight of total elastomeric polymer.

15. A tire tread comprising the vulcanized elastomeric polymer composition of claim 6.

16. A method for making a vulcanized elastomeric polymer composition, said method comprising combining at least the following constituents:
   1) a filler;
   2) a vulcanization agent; and
   3) a chain end modified elastomeric polymer which is the reaction product of:
      i) a living anionic elastomeric polymer, and
      ii) a silane-sulfide modifier represented by the formula:

$(RO)_x(R)_y Si-R'-S-SiR_3$ 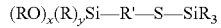

wherein:
Si is silicon; S is sulfur; O is oxygen;
x is an integer selected from 1, 2 and 3;
y is an integer selected from 0, 1, and 2; x+y=3;
R is the same or different and is: $(C_1-C_{16})$ alkyl; and R' is aryl, alkylaryl, or $(C_1-C_{16})$ alkyl; and,
vulcanizing the constituents wherein the vulcanized composition exhibits a tan δ at 60° that is lower than the tan δ at 60° of a second vulcanized composition, the second vulcanized composition differing from the vulcanized composition in that the second composition contains an elastomeric polymer that is not chain end modified with the silane-sulfide modifier.

17. The method of claim 16, wherein R' is a $(C_1-C_{16})$ alkyl.

18. The method of claim 16, wherein the composition further comprises an oil.

19. A composition comprising the following: (a) the chain end modified elastomeric polymer of claim 1, and (b) an oil.

20. The chain end modified elastomeric polymer of claim 1, wherein the modified elastomeric polymer is selected from the group consisting of modified homopolymers of butadiene and modified copolymers of butadiene with styrene.

21. The composition of claim 6 wherein the chain end modified elastomeric polymer is selected from the group consisting of modified homopolymers of butadiene and modified copolymers of butadiene with styrene.

22. The chain end modified elastomeric polymer of claim 1, wherein the living anionic elastomeric polymer is selected from the group consisting of homopolymers of isoprene, homopolymers of butadiene, copolymers of butadiene with styrene, copolymers of isoprene with styrene, terpolymers butadiene with isoprene and styrene, and combinations thereof.

23. The composition of claim 6, wherein the living anionic elastomeric polymer is selected from the group consisting of homopolymers of isoprene, homopolymers of butadiene, copolymers of butadiene with styrene, copolymers of isoprene with styrene, terpolymers butadiene with isoprene and styrene, and combinations thereof.

24. The composition of claim 1 wherein a chain end of the living anionic elastomeric polymer reacts with at least one RO—Si moiety to form the chain end modified elastomeric polymer.

25. The chain end modified elastomeric polymer of claim 1 wherein the reaction product further comprises an organic alkali metal initiator compound and wherein the silane-sulfide modifier is present from 0.05 to 5 mol-equivalent per mol-equivalent of the initiator compound.

26. A pneumatic tire comprising vulcanized elastomeric polymer composition wherein the composition comprises the reaction product of the following:
   1) a filler;
   2) a vulcanization agent; and
   3) a chain end modified elastomeric polymer, and wherein the chain end modified elastomeric polymer is the reaction product of:
      i) a living anionic elastomeric polymer, and
      ii) a silane-sulfide modifier represented by the formula:

$(RO)_x(R)_y Si-R'-S-SiR_3$ 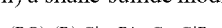

wherein:
   Si is silicon; S is sulfur; O is oxygen;
   x is an integer selected from 1, 2 and 3;
   y is an integer selected from 0, 1, and 2; x+y=3;
   R is the same or different and is: $(C_1-C_{16})$ alkyl; and R' is aryl, alkylaryl, or $(C_1-C_{16})$ alkyl, and
   wherein the tire exhibits a tan δ at 60° that is lower than the tan δ at 60° of a second tire, the second tire differing from the tire in that the second tire contains an elastomeric polymer that is not chain end modified with the silane-sulfide modifier.

27. A chain end modified elastomeric polymer, comprising a solution functionalized, polymerized rubber that comprises the reaction product of:
   iii) a living anionic elastomeric polymer, and
   iv) a silane-sulfide modifier represented by the formula:

$(RO)_x(R)_y Si-R'-S-SiR_3$ 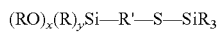

wherein:
   Si is silicon; S is sulfur; O is oxygen; x is an integer selected from 1, 2 and 3;
   y is an integer selected from 0, 1, and 2; x+y=3;
   R is the same or different and is $(C_1-C_{16})$ alkyl; and R' is aryl, and alkyl aryl, or $(C_1-C_{16})$ alkyl, and
   wherein the living anionic elastomeric polymer has a substantial amount of polymer chain ends that are not terminated prior to reaction with the modifier and whereupon addition of a vulcanization agent and subsequent vulcanization, the vulcanized composition exhibits a tan δ at 60° that is lower than the tan δ at 60° of a second vulcanized composition, the second vulcanized composition differing from the vulcanized composition in that the second vulcanized composition contains an elastomeric polymer that is not chain end modified with the silane-sulfide modifier.

* * * * *